(12) United States Patent
St-Pierre et al.

(10) Patent No.: US 11,858,759 B2
(45) Date of Patent: Jan. 2, 2024

(54) STICK LAYING APPARATUS AND STICK DISTRIBUTING UNIT FOR LAYING A PLURALITY OF SPACER STICKS OVER A BOARD LAYER

(71) Applicant: 9374-4399 Québec Inc., St-Félicien (CA)

(72) Inventors: Jean-Michel St-Pierre, St-Félicien (CA); Isabelle St-Pierre, St-Félicien (CA)

(73) Assignee: 9374-4399 Québec Inc., St-Félicien (CA)

( * ) Notice: Subject to any disclaimer, the term of this patent is extended or adjusted under 35 U.S.C. 154(b) by 0 days.

(21) Appl. No.: 17/661,477

(22) Filed: Apr. 29, 2022

(65) Prior Publication Data

US 2023/0183026 A1    Jun. 15, 2023

Related U.S. Application Data

(60) Provisional application No. 63/265,220, filed on Dec. 10, 2021.

(51) Int. Cl.
*B65G 57/26* (2006.01)
*B65G 57/18* (2006.01)

(52) U.S. Cl.
CPC ............ *B65G 57/26* (2013.01); *B65G 57/18* (2013.01)

(58) Field of Classification Search
CPC .................................. B65G 57/26; B65G 57/18
USPC ................................................ 414/798, 798.1
See application file for complete search history.

(56) References Cited

U.S. PATENT DOCUMENTS

| | | | | |
|---|---|---|---|---|
| 1,472,054 A | * | 10/1923 | Drake ................ | B65G 59/062 198/360 |
| 3,873,000 A | * | 3/1975 | Eaton ................. | B65G 59/063 221/298 |
| 5,863,176 A | * | 1/1999 | Newnes .............. | B65G 57/18 414/789.5 |
| 6,439,829 B1 | * | 8/2002 | Johnson ............. | B65G 57/005 414/789.5 |
| 9,272,852 B2 | | 3/2016 | St-Pierre et al. | |
| 11,220,405 B2 | | 1/2022 | St-Pierre et al. | |
| 2008/0267758 A1 | | 10/2008 | St-Pierre | |
| 2020/0087085 A1 | | 3/2020 | St-Pierre et al. | |

FOREIGN PATENT DOCUMENTS

CA          2143552 C  *  1/2000  ............ B65G 57/18

* cited by examiner

*Primary Examiner* — Lynn E Schwenning
(74) *Attorney, Agent, or Firm* — Neal, Gerber & Eisenberg LLP; Thomas E. Williams

(57) ABSTRACT

A stick distributing unit and corresponding method for laying spacer sticks over a board layer is provided. The unit includes a frame defining a stick-receiving area for receiving sticks and a hold-and-release mechanism configured to dispense each stick one-by-one. The hold-and-release mechanism includes a lower holding member selectively operable to hold and release a bottommost stick, and an upper holding member selectively operable to hold and release a penultimate stick. The unit also includes a controller configured to operate the lower and upper holding members to release the bottommost stick from the stick-receiving area and knock on the penultimate stick. The unit further has a stick-laying mechanism configured to receive and lay the released bottommost stick over the board layer.

17 Claims, 27 Drawing Sheets

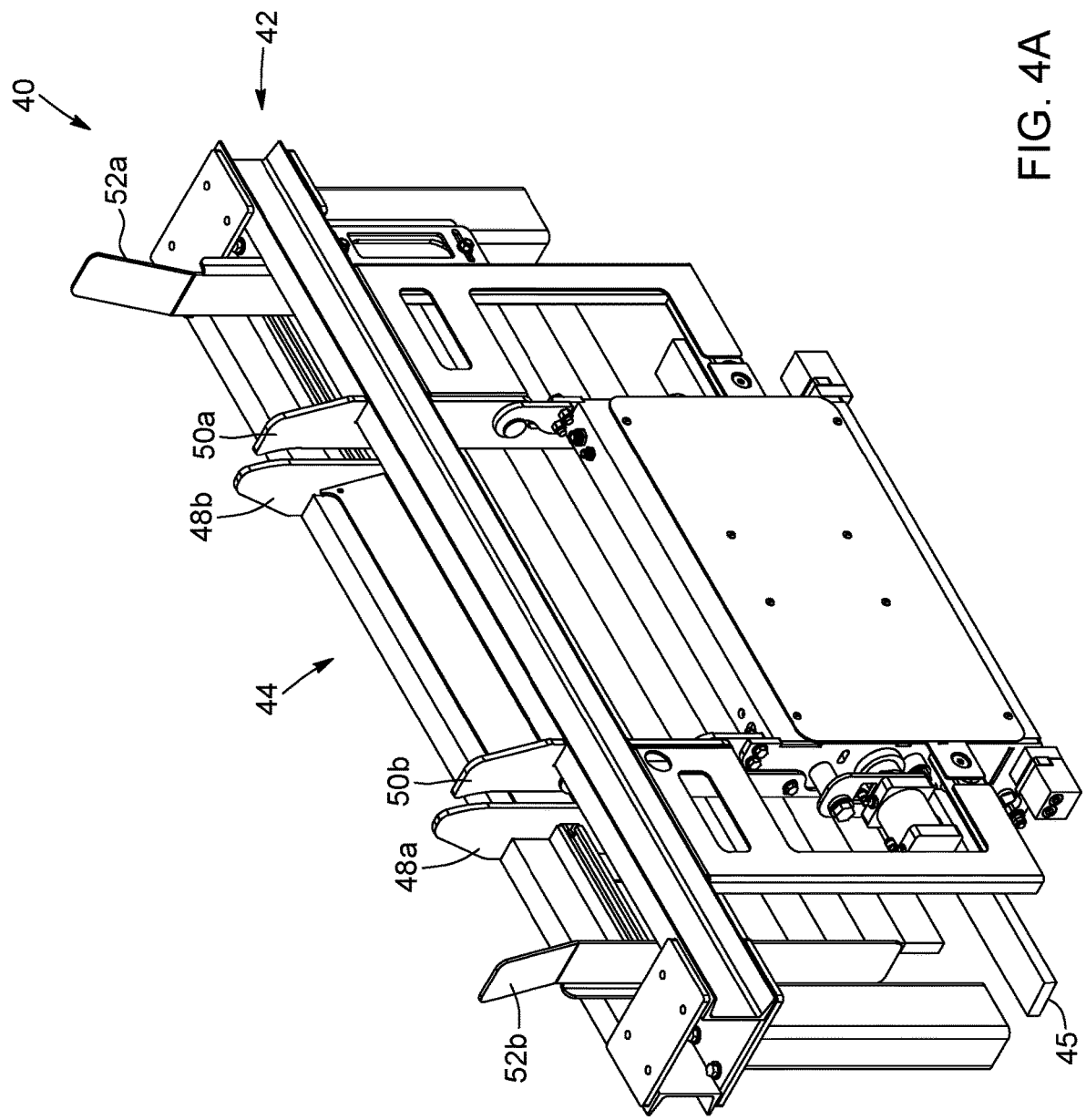

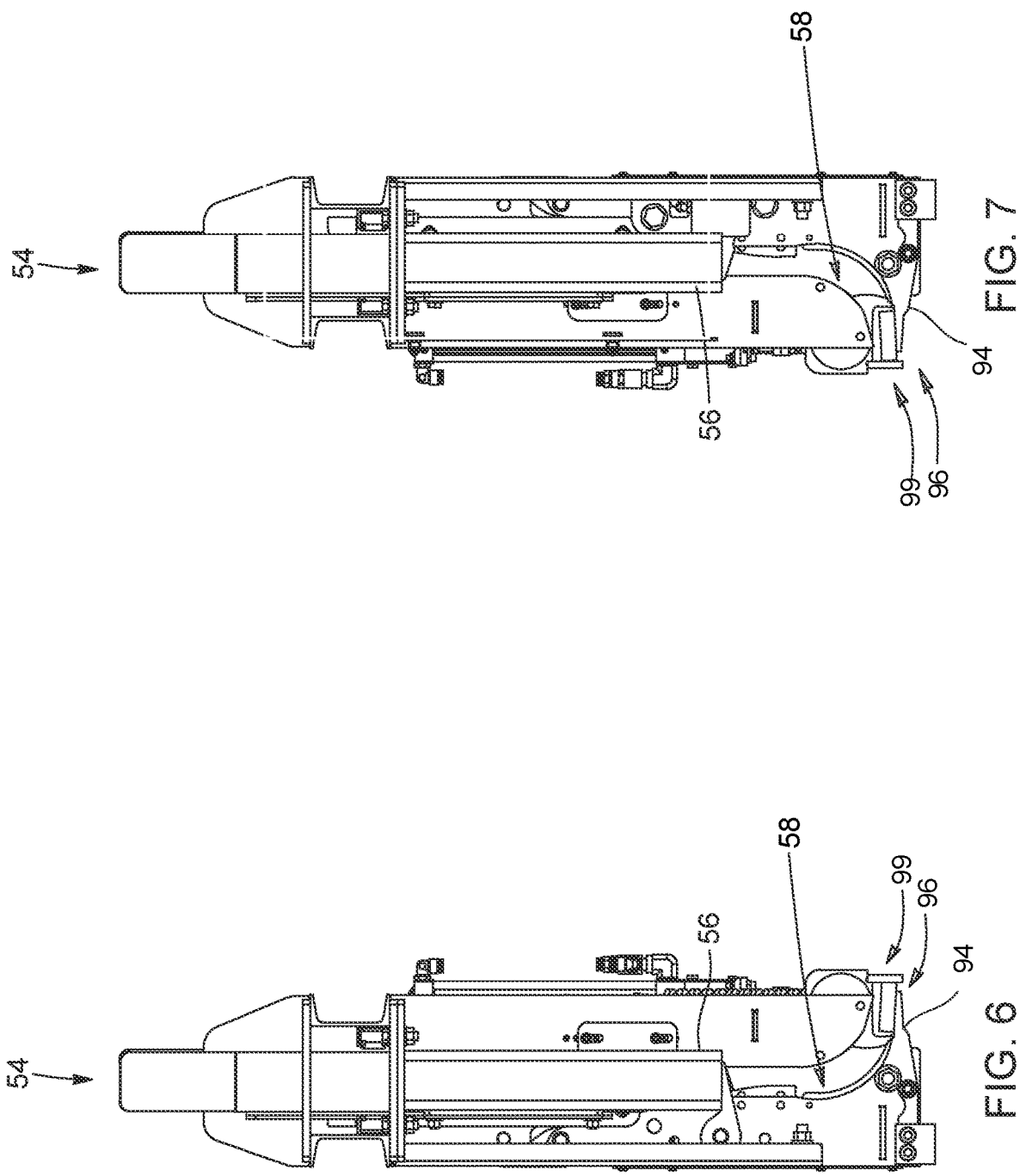

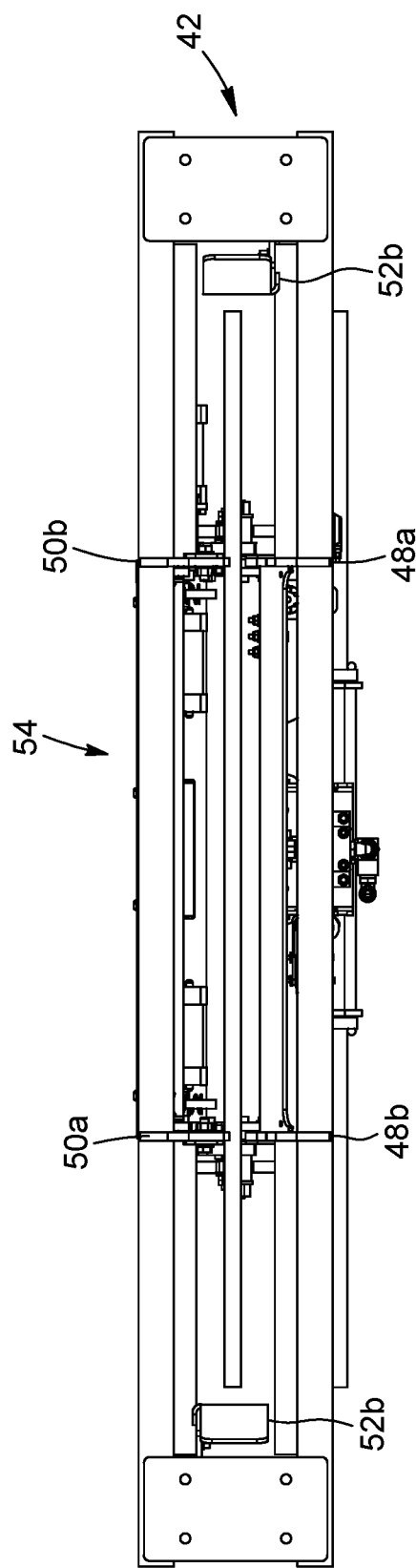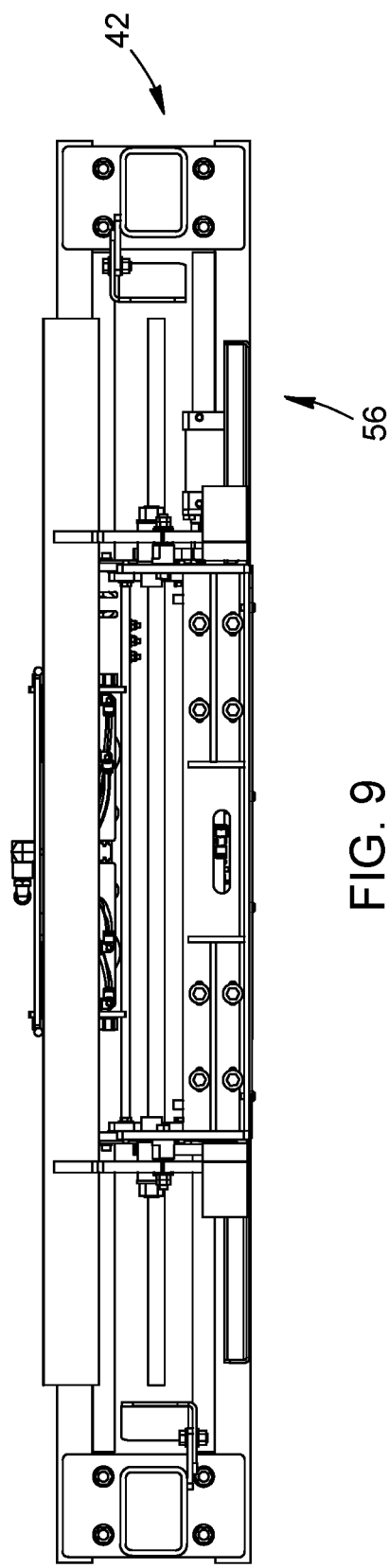
FIG. 8
FIG. 9

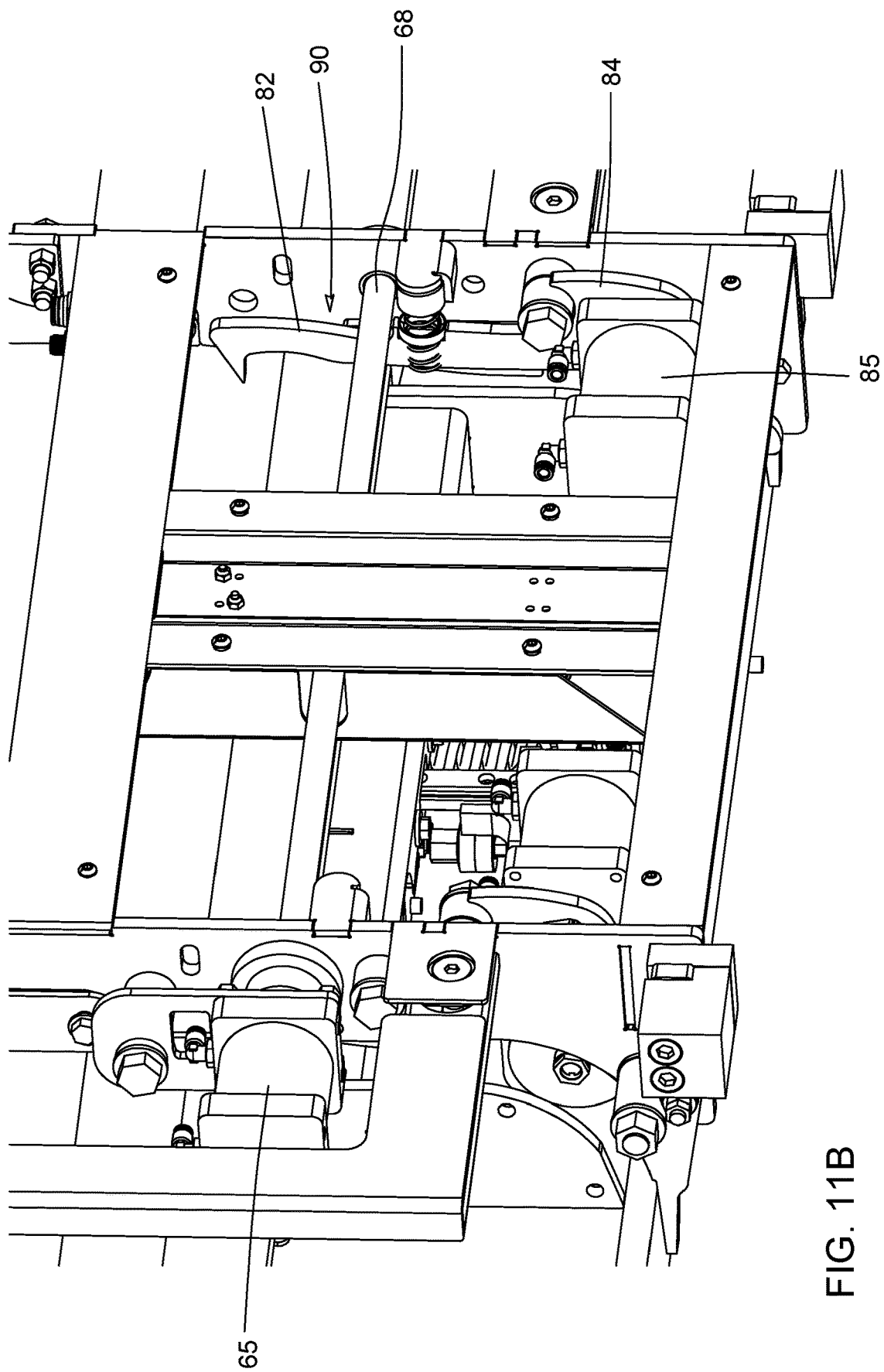

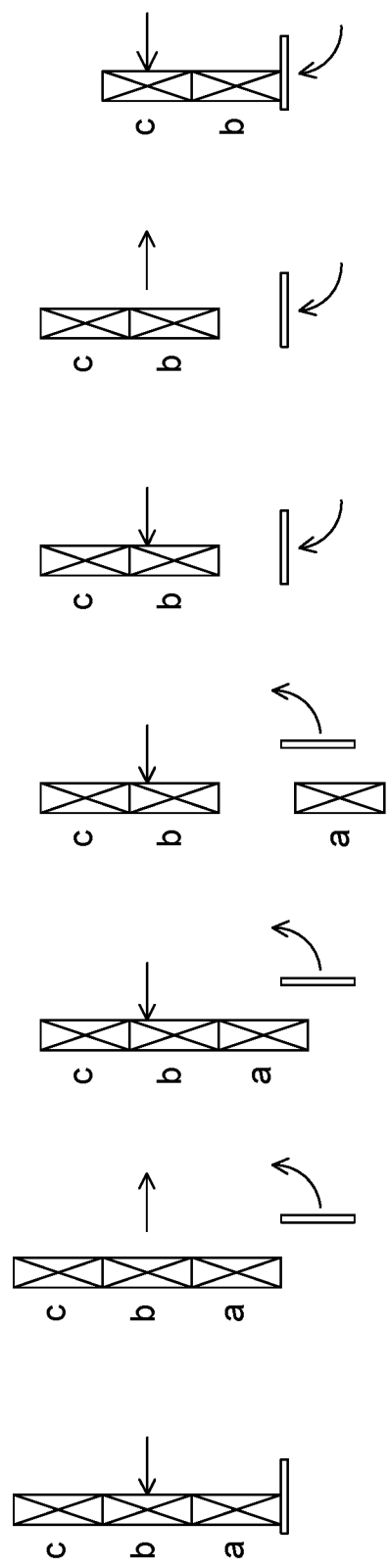

STICK LAYING APPARATUS AND STICK DISTRIBUTING UNIT FOR LAYING A PLURALITY OF SPACER STICKS OVER A BOARD LAYER

CROSS-REFERENCE TO RELATED APPLICATIONS

This application claims the benefit of U.S. Provisional Application No. 63/265,220, filed on Dec. 10, 2021, and entitled "STICK LAYING APPARATUS AND STICK DISTRIBUTING UNIT FOR LAYING A PLURALITY OF SPACER STICKS OVER A BOARD LAYER," which is incorporated by reference herein in its entirety.

TECHNICAL FIELD

The technical field generally relates to wood processing equipment and more specifically to a stick distributing unit for use in a stick laying apparatus for laying a plurality of spacer sticks over a board layer.

BACKGROUND

Stick placement machines are often used to place sticks between board layers, such as wood, to form a drying bundle. In this context, the sticks are positioned at intervals between each board layer to provide air spaces for uniform drying. The use of sticks also stabilizes the bundle and prevents boards from falling out.

Typically, this type of machine is often used in conjunction with a board stacking machine, where, in operation, the board stacking machine provides layers of boards on a bundle. Known stick laying machines are provided with units configured to serially lay multiple sticks at equal distances along the board's layers in a continuous manner. The units are, for example, disposed vertically or at an angle above the bundle. Prior art sticks placing units often include an elongated container for containing stacks of sticks, and the stick located at the bottom of the stack is collected and then provided on the horizontal surface of the board layer.

Automated lumber processing systems, for example board stacking machines, are increasingly high performing and operated at increasing speeds. The stick laying process must follow the rhythm, remain precise, and avoid interruptions and delays. Otherwise, this portion of the operation can become an undesired bottleneck.

Spacer sticks are often used several times before being decommissioned. For example, a stick may be used for up to ten drying cycles before it becomes obsolete. For financial reasons, it is common for a stick to be reused, even if it is slightly damaged or no longer has its original shape. As a result, it is not uncommon for the sticks to get stuck together in the device. In this situation, an operator must then stop the stick laying process and manually dislodge the sticks from each other, resulting in a considerable waste of money and time. Existing automated systems for feeding and laying sticks require a superior quality of sticks to keep blockage to a minimum. This involves a higher rejection rate and a shorter life cycle for sticks, leading to the necessity to renew stick inventories more often, at significant increase in operational costs. It is thus desirable in the industry to keep spacer sticks for as long as possible and for as many laying cycles as possible.

In other situations, some types of lumber require the sticks to be laid closer to one another on the board layers. The machines must therefore be rearranged so that the units are closer together to allow sticks to be deposited over shorter distances. However, for certain types of lumber such as hardwood, it becomes difficult to access the spaces between the units, as the sticks are noticeably closer to each other. In particular, since the units of the existing machines are rather broad, it becomes tedious and time consuming for an operator to place himself between two units to perform manual maintenance operations and/or to dislodge a stick.

Hence, in light of the above, a need exists for a system to overcome the aforementioned limitations of current stick placement machines.

SUMMARY

In accordance with one aspect, there is provided a stick laying apparatus for laying spacer sticks on a board layer of a board bundle. The stick laying apparatus comprises a support structure adapted to be disposed above the bundle; and a plurality of stick distributing units mounted to the support structure over the board bundle and equidistantly spaced apart according to a predetermined spacing, each stick distributing unit comprise: a frame defining a stick-receiving area for receiving a plurality of the spacer sticks in a vertical stack, the stick-receiving area having an open bottom end; a hold-and-release mechanism operatively coupled to the frame and configured to dispense one-by-one each spacer stick of the vertical stack from the open bottom end of the stick-receiving area, and a stick-laying mechanism operatively coupled to the frame and configured to receive the spacer sticks upon release by the hold-and-release mechanism and laying the same over the board layer; wherein the stick distributing units each have a front and a rear side, at least one of said front and rear sides being free of obstructions along the stick-receiving area.

According to an embodiment of the stick laying apparatus, the plurality of stick distributing units are removably mounted to the support structure over the board bundle.

According to an embodiment of the stick laying apparatus, the plurality of stick distributing units are secured to the support structure over the board bundle.

According to an embodiment of the stick laying apparatus, the predetermined spacing at which the plurality of stick dispensing units are disposed is about 12 inches.

In accordance with another aspect, there is provided a stick distributing unit for use in a stick laying apparatus for laying a plurality of spacer sticks over a board layer. The stick distributing unit comprises a frame defining a stick-receiving area adapted to receive the plurality of spacer sticks in a vertical stack, the stick-receiving area having an open bottom end; a hold-and-release mechanism configured to dispense one-by-one each stick of the vertical stack from the open bottom end of the stick-receiving area. The hold-and-release mechanism comprises at least one lower holding member, operable between a lower holding position, where the lower holding member is adapted to hold a bottommost stick of the vertical stack, and a lower release position, where the lower holding member is adapted to release the bottommost stick; at least one upper holding member, operable between an upper holding position, where the upper holding member is adapted to hold a penultimate stick of the vertical stack, and an upper release position, where the upper holding member is adapted to release the penultimate stick; and a controller configured to provide control signals operating a stick dispensing routine. The stick dispensing routine comprises the steps of: a) setting the at least one lower holding member in the lower holding position and the at least one upper holding member in the upper release position to support the vertical stack from the bottommost stick in the stick-receiving area; b) setting the at least one upper holding member to the upper holding position to support the vertical stack from the penultimate stick in the stick-receiving area, and setting the at least one lower holding member to the lower release position, thereby releasing the bottommost stick to fall through the open bottom end of the stick-receiving area; and c) cyclically repeating steps a) and b). The hold-and-release mechanism also comprises a stick-laying mechanism configured to receive the bottommost stick upon release by the at least one lower holding member and laying the same over the board layer, wherein the hold-and-release mechanism is further configured to knock on the penultimate stick between steps b) and c).

According to an embodiment, the frame comprises front support beams and back support beams, the front support beams and the back support beams being spaced from each other by at least a width of an individual spacer stick.

According to an embodiment, the frame comprises side support beams positioned on either side of the front and back support beams, the side support beams being spaced from each other by at least a length of an individual spacer stick.

According to an embodiment, the front support beams, the back support beams and the side support beams define the stick-receiving area.

According to an embodiment, the front support beams and the back support beams comprise matching curved profile at respective bottom ends thereof forming a guiding path below the open bottom end of the stick-receiving area.

According to an embodiment, the matching curved profiles are shaped to shift an orientation of the bottommost stick from vertical to substantially horizontal as the bottommost stick travels along the guiding path towards an exit thereof.

According to an embodiment, the stick-laying mechanism comprises one or more support arms operatively coupled to the frame and operable between a raised position and a lowered position, wherein in the raised position the support arms are positioned and adapted to receive the bottommost stick as it exits the guiding path, and wherein in the lowered position, the support arms pivot downwardly to let go of the bottommost stick.

According to an embodiment, the stick-laying mechanism comprises a moving head mounted to the frame, the moving head being operable to move with respect to the frame between a stick-receiving position and a stick-laying position, wherein in the stick-receiving position, the moving head is adapted to receive and hold the bottommost stick, and wherein in the stick-laying position, the moving head is adapted to release and lay the bottommost stick over the board layer.

According to an embodiment, the stick-laying mechanism comprises a pneumatically-actuated shaft mounted on the frame, the pneumatically-actuated shaft being configured to transition the moving head between the stick-receiving position and the stick-laying position.

According to an embodiment, the moving head comprises an L-shaped bracket connected to the pneumatically-actuated shaft.

According to an embodiment, the moving head comprises grabbing fingers pivotally mounted on either side of the L-shaped bracket, the grabbing fingers being adapted to rotate to grab the bottommost stick between the grabbing fingers and the L-shaped bracket, and selectively let go of the bottommost stick once in position over the board layer.

According to an embodiment, the controller is further configured to provide control signals to the stick-laying mechanism for operating a stick dispensing routine including the steps of: a) operating the support arms in the raised position and receiving the bottommost stick thereon; b) setting the moving head in the stick-receiving position and rotating the pair of grabbing fingers to grab the bottommost stick; c) pivoting the support arms to the lowered position; d) displacing the moving head into the stick-laying position above the board layer; and e) rotating the pair of grabbing fingers to let go of the bottommost stick, therefore laying the bottommost stick on the board layer.

According to an embodiment, the stick-receiving area comprises an open top end opposite to the open bottom end, the plurality of spacer sticks being received in the stick-receiving area from the open top end.

According to an embodiment, the at least one lower holding member comprises bottom catches pivotally coupled to the frame adjacent the stick-receiving area and below the open bottom end.

According to an embodiment, the at least one lower holding member comprises a pair of bottom catches pivotally coupled to respective back support beams.

According to an embodiment, each bottom catch comprises a rotating portion pivotally coupled to the frame, and a support projection projecting radially from the rotating portion, and wherein the support projection is adapted to support the bottommost stick within the stick-receiving area.

According to an embodiment, each rotating portion is mounted on a common rotating shaft, and wherein the hold-and-release mechanism further comprises a rotary actuator adapted to rotate the common rotating shaft in a back-and-forth movement.

According to an embodiment, the rotary actuator includes a pneumatic system or an electric motor.

According to an embodiment, the stick dispensing routine operated by the controller comprises quickly releasing and re-engaging the upper holding member with the penultimate stick, thereby creating the knock on the penultimate stick.

According to an embodiment, the upper holding member is adapted to release and re-engage the penultimate stick in a fraction of a second.

According to an embodiment, the at least one upper holding member comprises at least one grip hook adapted to engage the penultimate stick, the at least one grip hook being provided on a rear side of the stick-receiving area.

According to an embodiment, the at least one grip hook is substantially S-shaped and comprises a gripping top portion, a pivoting bottom portion and a curved middle section.

According to an embodiment, the stick distributing unit further comprises a grip hook rotary actuator, the grip hook rotary actuator having a rotating shaft coupled to the pivoting bottom portion, the rotary actuator being adapted to pivot the pivoting bottom portion about an axis substantially perpendicular relative to a plane in which the at least one grip hook extends.

According to an embodiment, the gripping top portion comprises a tooth adapted to engage a rear surface of the penultimate stick in the holding position.

In accordance with another aspect, there is provided a method of laying a spacer stick over a board layer using a stick-distributing unit of a stick-laying apparatus, the stick-distributing unit retaining a plurality of spacer sticks in a stack from below within a stick-receiving area. The method comprises the steps of: i. releasing a bottommost spacer stick from the stick-receiving area to a stick-laying mechanism; ii. knocking on a penultimate spacer stick; iii. retaining the stack of spacer sticks within the stick-receiving area such that the penultimate spacer stick becomes a new bottommost spacer stick; iv. positioning the stick-laying mechanism over the board layer; v. laying the bottommost spacer stick on the board layer.

According to an embodiment of the method, the steps i. to v. are cyclically repeated using the new bottommost spacer stick.

In accordance with another aspect, a stick distributing unit is provided for use in a stick laying apparatus for laying a plurality of spacer sticks over a board layer. The stick distributing unit comprises a frame defining a stick-receiving area adapted to receive the plurality of spacer sticks; a hold-and-release mechanism operatively coupled to the frame and defining a release path, the hold-and-release mechanism being adapted to selectively dispense the spacer sticks from the stick-receiving area one at a time along the release path. The hold-and-release mechanism comprises a first holding member operable to selectively engage the release path to hold and release a bottommost stick of the vertical stack; a second holding member operable to selectively engage the release path to hold and release a penultimate stick of the vertical stack; and a controller configured to define a stick dispensing routine. The stick dispensing routine comprises the steps of a) operating the first holding member to engage the release path to hold the bottommost stick; b) operating the second holding member to engage the release path to hold the penultimate stick; operating the first holding member to disengage the release path to release the bottommost stick from the stick-receiving area; and cyclically repeating steps a) to c) with remaining sticks from the plurality of spacer sticks; The stick distributing unit also comprises a stick-laying mechanism configured to receive the bottommost stick from the hold-and-release mechanism and lay the same over the board layer, wherein the second holding member is further adapted to knock on the penultimate stick between steps c) and d).

Other features and advantages will be better understood upon reading of embodiments thereof with reference to the appended drawings.

BRIEF DESCRIPTION OF THE DRAWINGS

FIG. 4A is a top perspective view of a stick distributing unit, showing a frame defining a stick receiving area to receive a plurality of spacer sticks in a vertical stack, according to an embodiment.

FIGS. 6 and 7 are left and right side views of the stick distributing unit of FIG. 4A, illustrating an open top end and open bottom end of the stick receiving area, according to an embodiment.

FIG. 8 is a top plan view of the stick distributing unit, illustrating the top open end of the stick receiving area, according to an embodiment.

FIG. 9 is a bottom plan view of the stick distributing unit, illustrating the bottom open end of the stick receiving area, according to an embodiment.

FIGS. 11A and 11B are rear perspective views of the stick distributing unit shown in FIG. 4A, showing a lower holding member releasing the bottommost spacer stick of the vertical stack and an upper holding member holding a penultimate spacer stick, according to an embodiment.

FIGS. 19A to 19G are schematic views of a stick dispensing routing, according to an embodiment.

DETAILED DESCRIPTION

Figure 1A:
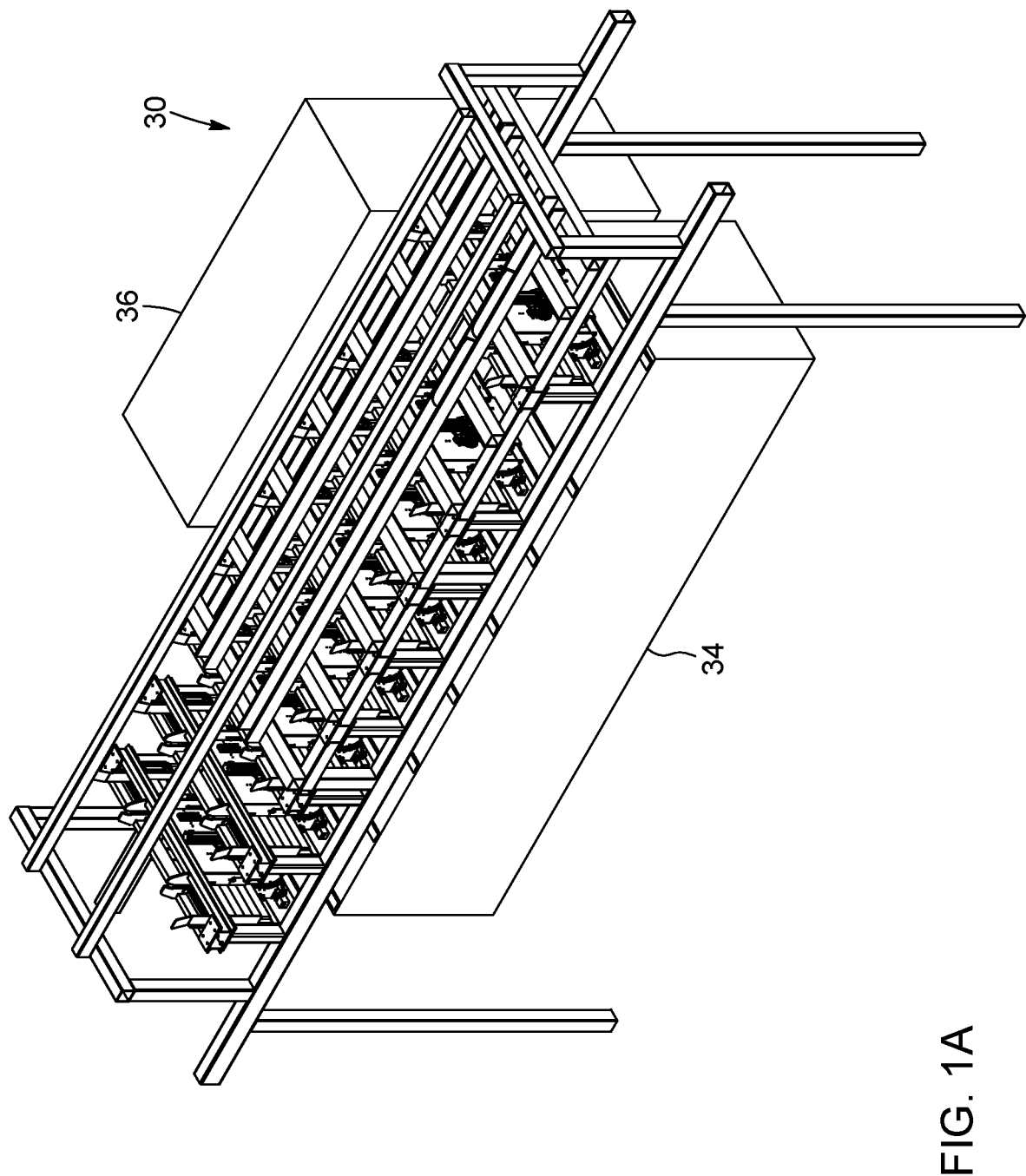
FIG. 1A is a top perspective view of a stick laying apparatus having a plurality of spaced apart stick distributing units, according to an embodiment.
Figure 1B:
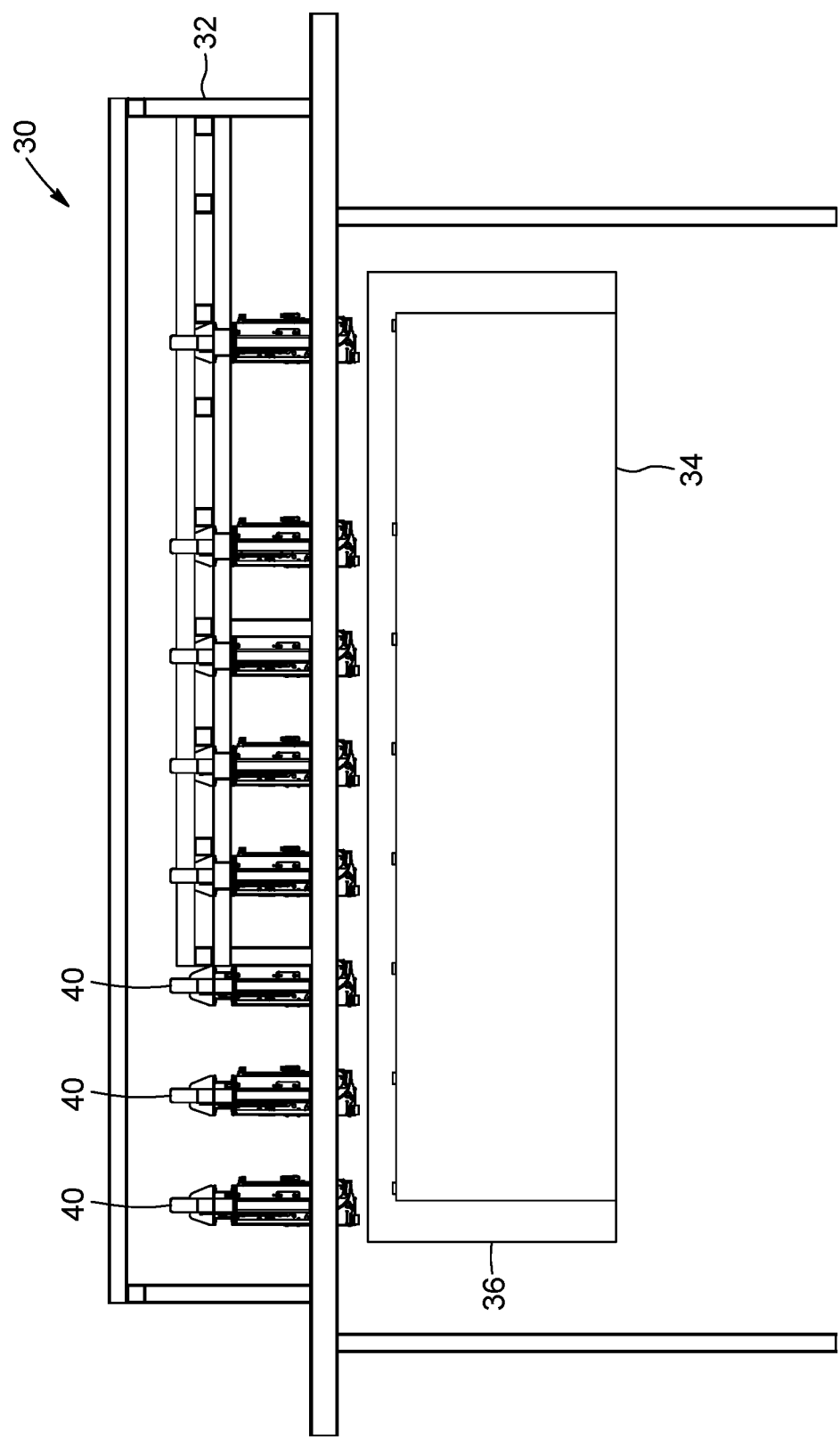
FIG. 1B is a side elevation view of the stick laying apparatus of FIG. 1A, showing the plurality of stick distributing units mounted on a support structure over a board bundle, according to an embodiment.
Figure 1C:
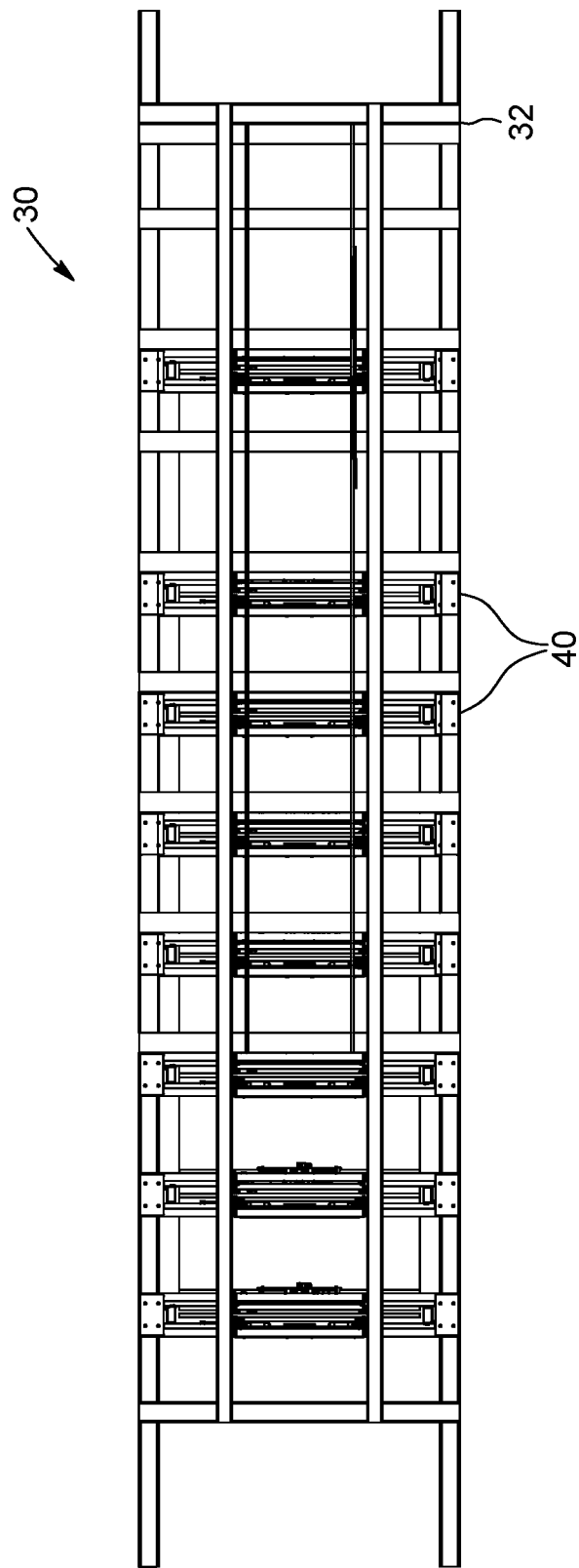
FIG. 1C is top elevation view of the stick laying apparatus of FIG. 1A, showing multiple stick distributing units spaced apart from each other by regular intervals, according to an embodiment.

Various embodiments are described in the following disclosure with reference to the accompanying Figures. It should be understood that the elements of these figures are not necessarily depicted to scale, since the emphasis is placed upon clearly illustrating the elements and structure of the present embodiments. In the following description, it will be understood that the same numerical references refer to similar elements. Furthermore, for the sake of simplicity and clarity, namely, so as to not unduly burden the figures with several numbers, not all figures contain references to all the components and features, and references to some components and features can thus be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

The present description generally concerns a stick laying apparatus for laying a plurality of sticks over a board layer, and a stick distributing unit for use on such a stick laying apparatus.

Stick Laying Apparatus

Stick laying apparatuses are used in the lumber industry in the context of drying boards. Typically, after treatment, boards must be dried for a certain period of time. To do this, the boards are laid out in a bundle having multiple layers, and spacer sticks are disposed between the board layers to provide a spacing between them. A board layer can be formed of a finite number of boards disposed side-by-side, and the bundle can be formed of a finite number of board layers stacked one on top of the other. In the context of the present application, a board may be understood to refer to any type of lumber to be stacked, such as, without being limitative, boards, flitches, planks, joist, beams, panels or the like. The interstitial space between the board layers provide air communication between the tiers or layers of boards in order to allow uniform drying of the wood as well as to structurally stabilize the bundle. Depending on the type of wood board to be dried, the spacer sticks in a same plane can be positioned closer or farther from each other. Having spacer sticks positioned at a closer distance allows the bundle to be held more compactly, resulting in increased drying quality and minimising the possibility of the wood boards bending during the drying process. However, this requires considerable costs, as more spacer sticks are needed to cover the same area.

The spacer sticks are typically made of wood. They are generally rectangular in shape and have varying dimensions, for example ⅛"×¾" to 1×3". The length of the sticks is generally the same as the width of the bundles in the mill where they are being used, although other configurations are possible. The surfaces of the sticks can be flat or "aerated". The finish of the surface can be smooth or rough. The sticks can be made out of any wood species. A mill's inventory can have sticks coming from various sources, including inhouse (e.g., when the mill is a lumber mill) or from an outside source. Also, when they have gone through one or more laying, drying and unlaying cycles, the size and quality of the sticks vary each time. Therefore, an inventory can be composed of sticks with varying mechanical and geometric properties. In other embodiments, the sticks may be made of other materials such as plastics, cardboards or metals.

On average, a spacer stick has a life span of about 8 to 10 drying cycles. The expression drying cycles refers to the number of times a spacer stick is laid between two layers of wood for a drying period. During the lifetime of the spacer stick, it typically tends to shrink, deform or shatter slightly on the edges.

A stick laying apparatus is typically used in conjunction with a board stacking device configured to place the wood boards on the bundle in a layer-by-layer stacking process. An example of a boards stacking device is shown in published patent application U.S. 2020/0087085 (I. ST-PIERRE et al), the entire contents of which is incorporated herein by reference.

Referring to FIGS. 1A to 3B, there is illustrated a stick laying apparatus 30 according to one embodiment.

The stick laying apparatus 30 may include a support structure 32 shaped to be disposed above a board bundle 34 on which boards are sequentially arranged in board layers to be separated by the spacer sticks. As mentioned above, the board layers 34 may be provided by a board stacking device 36, positioned at proximity of the stick laying apparatus. The support structure 32 may include any number and/or type of suitable structural elements such as beams, shafts, panels, walls, connectors, and the like in order to provide support, rigidity and stability sufficient for a given application.

The stick laying apparatus 30 may further include a plurality of stick distributing units 40. In this embodiment, the stick distributing units 40 are mounted to the support structure 32 over the board bundle 34 and are spaced apart according to a predetermined spacing between the sticks. In some embodiments, stick distributing units 40 are equidistant. In other variants, the spacing between different pairs of sticks may vary. For instance, the number of sticks may vary resulting in a variation in the distance between the sticks. In some other variations, some pairs of sticks may be closer together (e.g., the spacing between one pair of sticks may be smaller than the spacing with the adjacent pair of sticks). In other cases, the placement of the sticks may further not be straight on the board. The stick distributing units 40 may be rigidly, slidably or removably affixed to the support structure of the stick laying apparatus so as to be suspended above the board bundle 34. As explained in details further below, each stick distributing unit includes a frame defining a stick-receiving area for receiving a plurality of the spacer sticks which can define a vertical stack, the stick-receiving area having an outlet, such as an open bottom end; a hold-and-release mechanism configured to dispense one-by-one each stick of the vertical stack from the bottom end of the stick-receiving area, and a stick-laying mechanism configured to receive the sticks upon release by the hold-and-release mechanism and to lay the same over the board layer.

The predetermined spacing between neighboring stick distributing units is selected to allow the concurring parallel laying of spacer sticks over a board layer of the bundle at a desired distance from each other. This distance is typically imposed by a given application, for example, best practices for the type of wood of the boards in the bundle. In some embodiments, the stick distributing units are disposed at a predetermined spacing, such as a spacing of about 12 inches. This configuration is, for example, advantageous in the context of drying hardwood boards, but more generally, considered desirable in the industry. However, one impediment to the use of such closely positioned stick distributing units is that access to the unit (e.g., for maintenance or repairs) is limited. For example, typical stick distributing units have a total width of about 9 inches, leaving only about 3 inches of free space between adjacent units when spaced by about 12 inches. This free space is so small that it is impossible for an operator to walk between units or even manually access the mechanisms of the unit(s) from the sidelines.

Figure 2A:
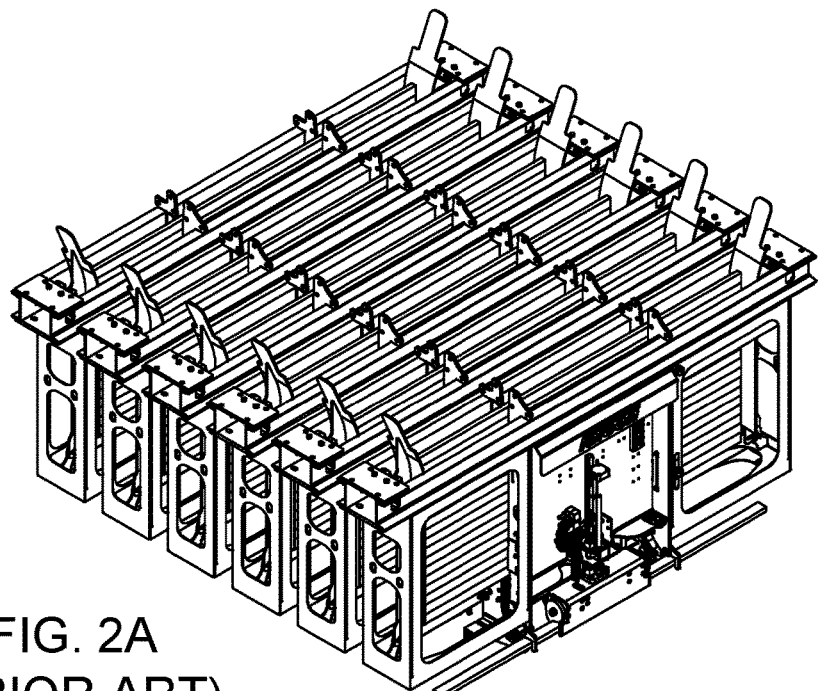
FIG. 2A (PRIOR ART) is a top perspective view illustrating a plurality of stick distributing units, according to prior art.
Figure 2B:
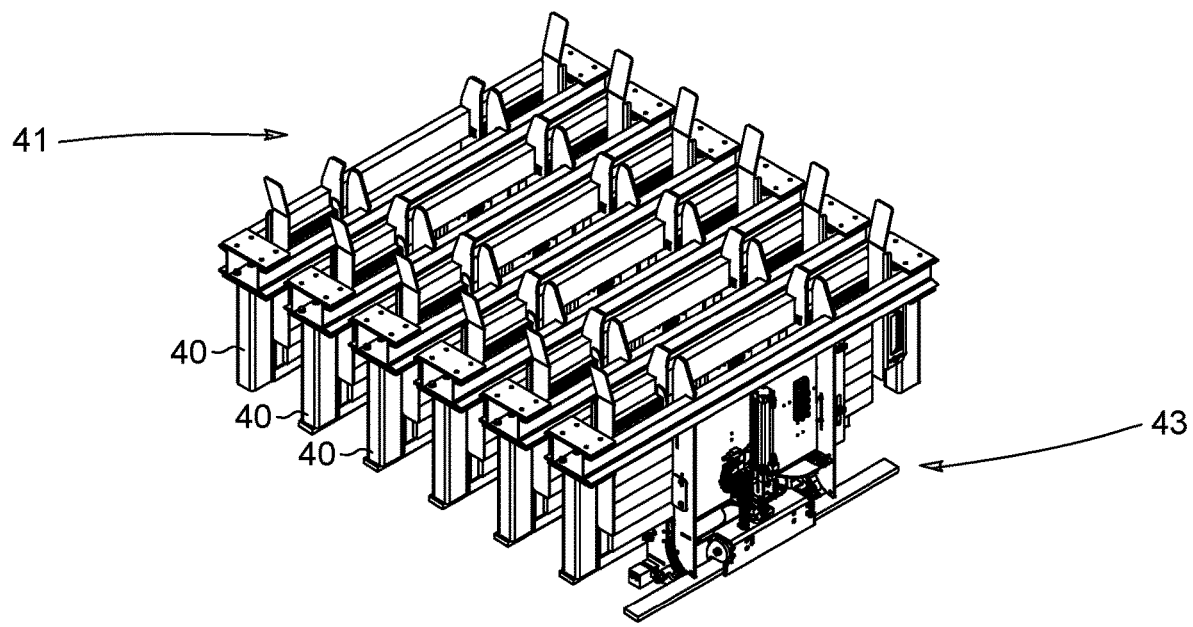
FIG. 2B is a top perspective view, illustrating a plurality of stick distributing units according to an embodiment.
Figure 3B:
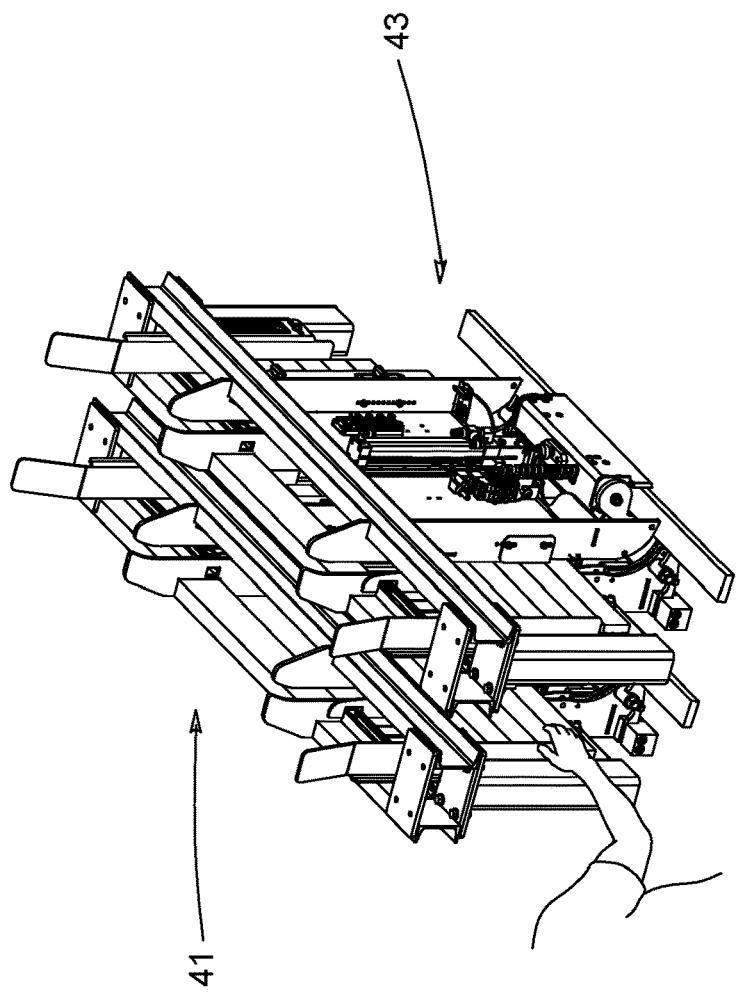
FIG. 3B is a top perspective view of two stick distributing units having a front side and a rear side generally free of obstructions, illustrating the arm of an operator able to access a space between the two distributing units, according to an embodiment.
Figure 3A:
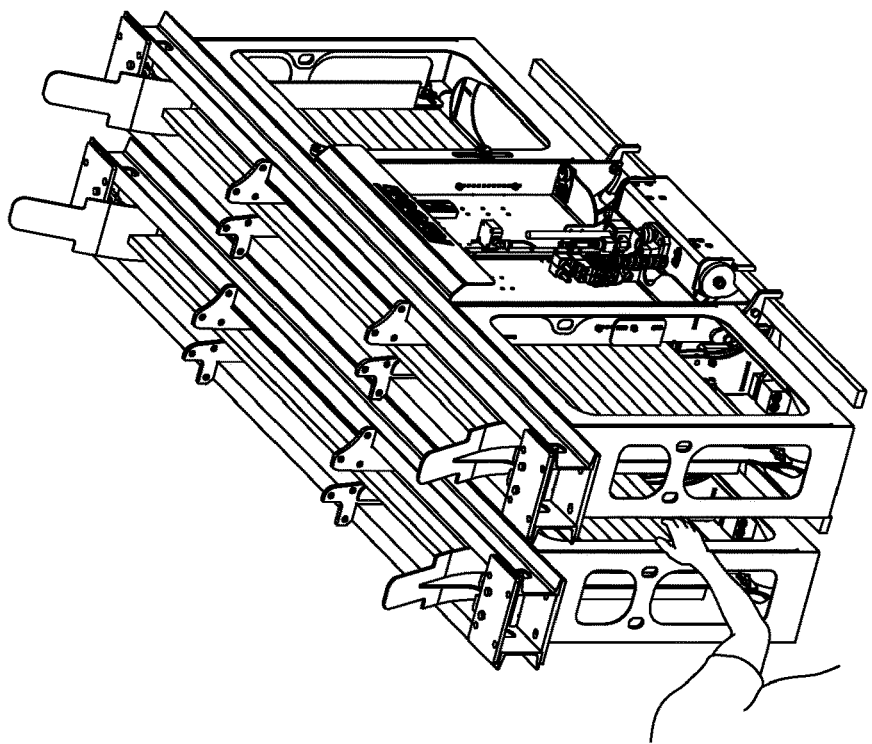
FIG. 3A (PRIOR ART) is a top perspective view of two stick distributing units, illustrating the arm of an operator being prevented from accessing a space between the two stick distributing units, according to prior art.
Figure 4B:
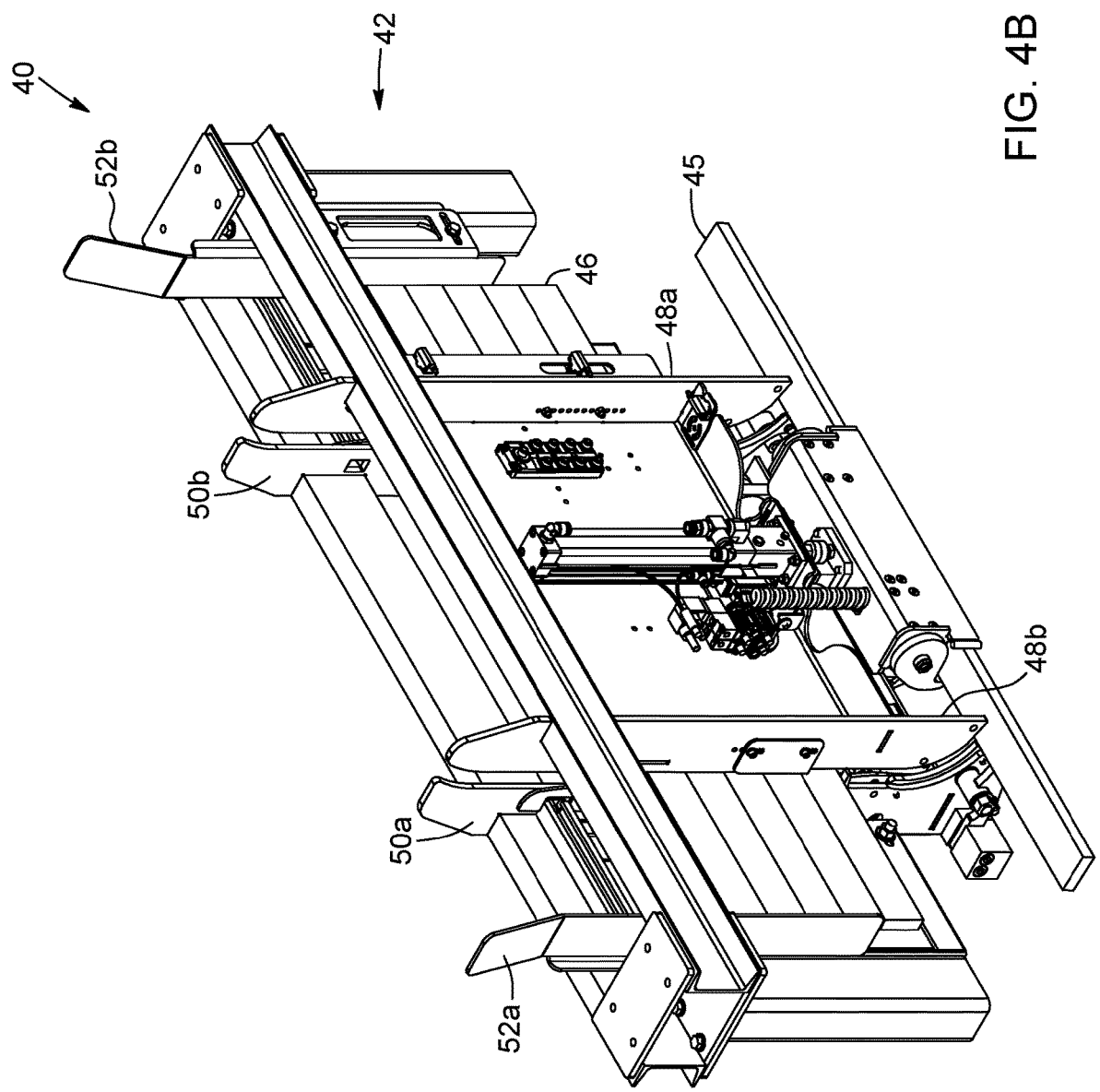
FIG. 4B is a top perspective view of the stick distributing unit of FIG. 4A, showing a stick-laying mechanism configured to receive and lay a bottommost stick of the vertical stack on a board layer, according to an embodiment.
Figure 5A:
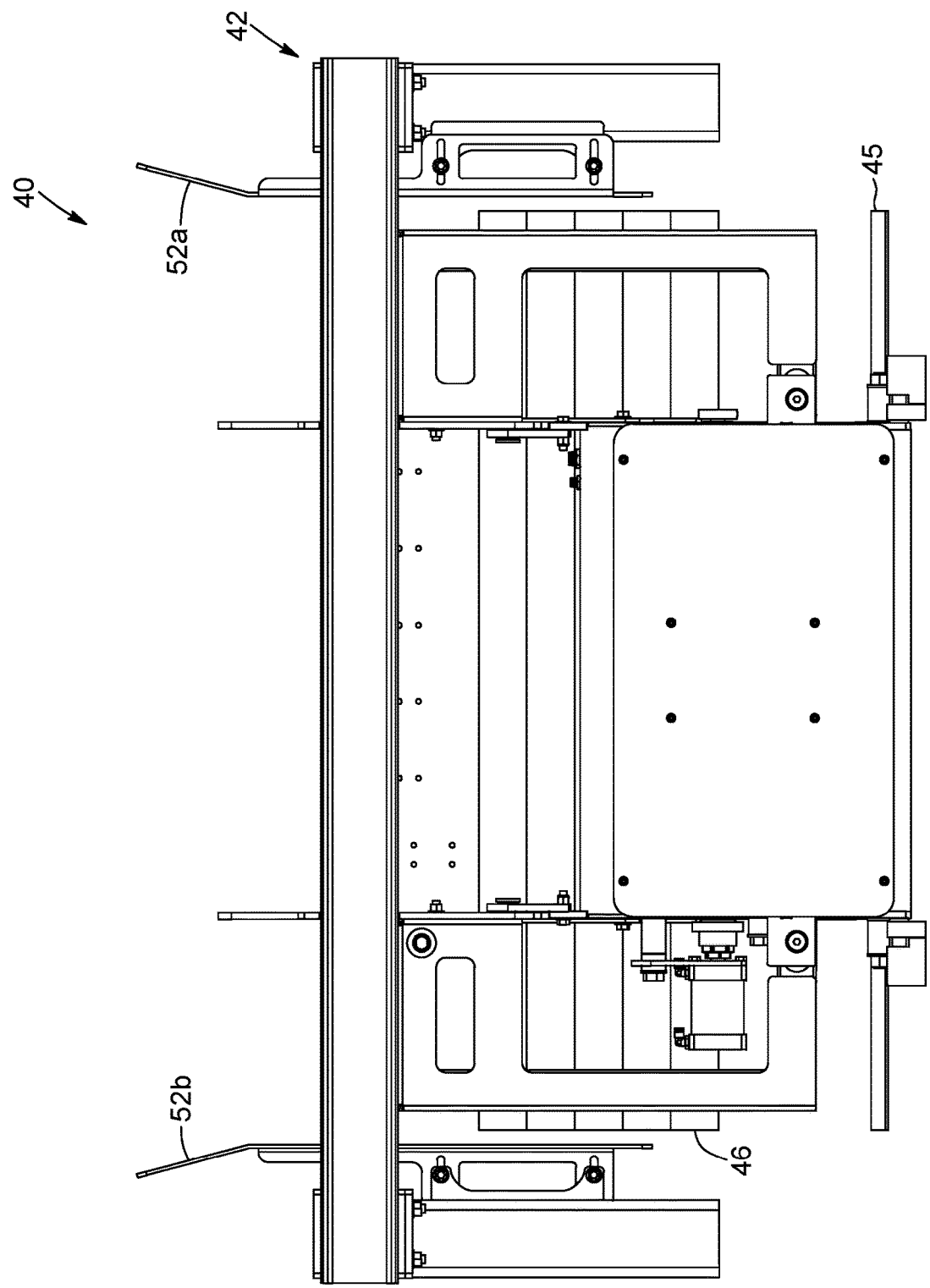
FIG. 5A is a rear view of the stick distributing unit of FIG. 4A, showing a bottommost stick held by the stick-laying mechanism, according to an embodiment.
Figure 5B:
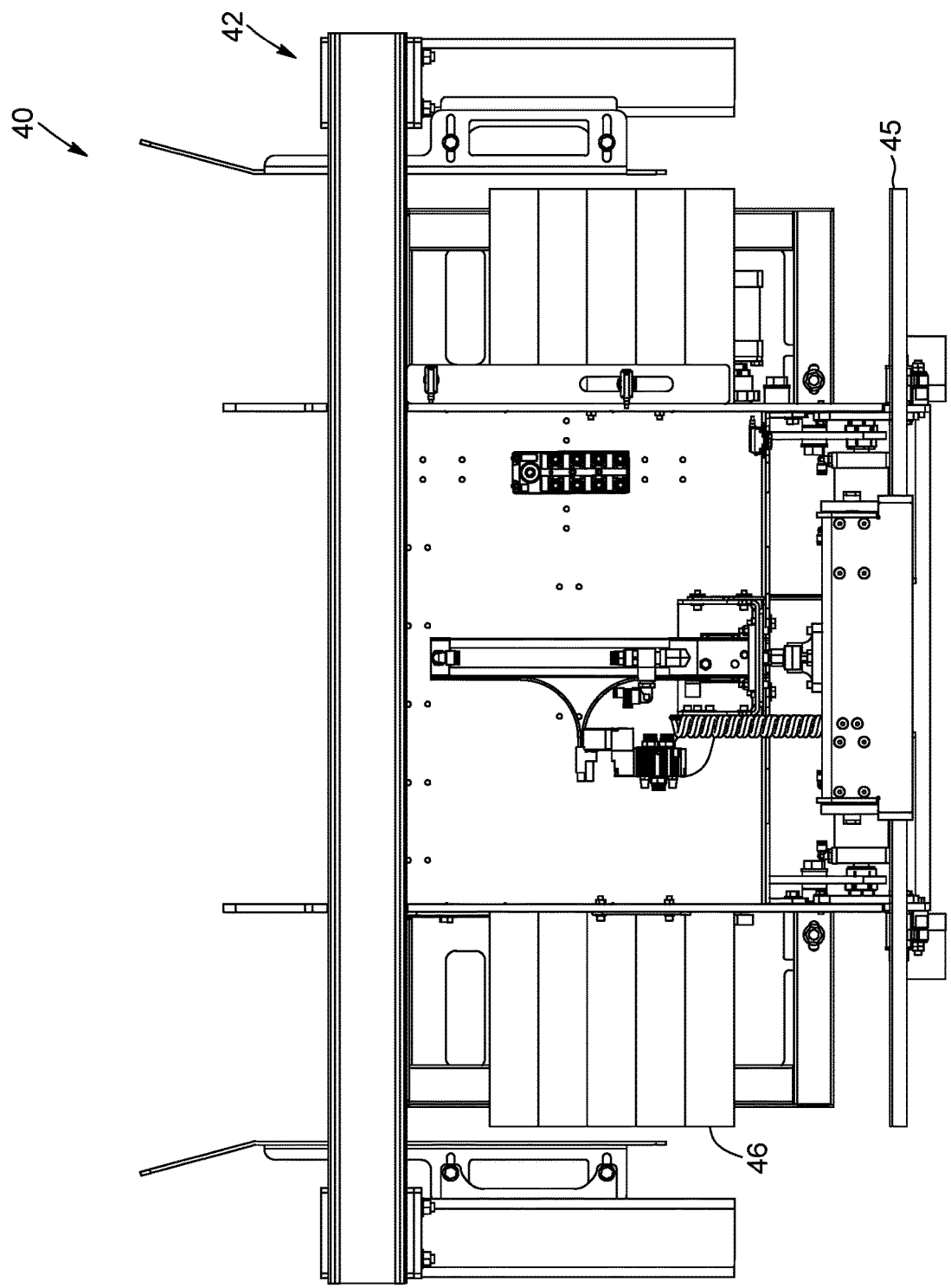
FIG. 5B is a front view of the stick distributing unit of FIG. 4B, showing a pneumatic cylinder configured to actuate the stick-laying mechanism, according to an embodiment.

Referring to FIGS. 2A, 2B, 3A and 3B, the stick distributing units each have a front and a rear side 41, 43 defined as the sides along the length of the stick distributing unit. It will be readily understood that the designation of front and rear are made as a convention for ease of reference only, and are not meant to convey a preferred orientation to the units. One or both of the front and rear sides 41, 43 are free of obstructions along the stick-receiving area. It should be understood that, in the context of the present disclosure, the expression "free of obstructions" can refer to an absence of structure, mechanical components, other mechanisms such as electrical or hydraulic components, etc. extending alongside the stick-receiving area which could prevent an operator from accessing the space between neighboring stick distributing units. Advantageously, this enables an operator to slide their arm between adjacent stick distributing units and access, manipulate or remove part(s) of interests, or for maintenance and/or repair purposes, such as for example components of the hold-and-release mechanism or of the stick laying mechanism. This can be seen on FIGS. 2B and 3B, whereas FIGS. 2A and 3A represent known stick laying apparatuses which can have restricted spacing between stick distributing units.

An embodiment of a stick distributing unit 40 which may be used in the stick laying apparatus 30 will now be described in more details.

Stick Distributing Unit

Referring to FIGS. 4A to 9 there is shown a stick distributing unit 40 according to a possible embodiment.

The stick distributing unit 40 includes a frame 42 defining a stick-receiving area 44 for receiving the plurality of spacer sticks 45. In this embodiment, the spacer sticks are received in the stick-receiving area so as to form a single vertical stack 46, although it should be noted that other configurations are possible, such as two or more adjacent vertical stacks positioned within the stick-receiving area 44, for example. The frame 42 may include any arrangement of beams, supports, shafts and associated structure adapted to form a space in which the sticks 45 can be received in a stacked arrangement (e.g., the stick-receiving area 44). The frame 42 may be a structure made of steel, aluminum or other durable materials of this type allowing to support the continuous intake of sticks.

It should be noted that the frame 42 can be made of a single wielded piece of material or of a set of pieces joined to each other. In the illustrated embodiment, the frame 42 includes a pair of front support beams 48a,b and a pair of back support beams 50a,b. The front and back support beams 48, 50 are spaced apart to form a rectangular area therebetween and are separated by a distance generally corresponding to the width of the individual sticks 45. In other words, the front and back support beams 48, 50 are spaced apart to enable a single vertical stack of sticks 45 to be formed therebetween, although it is appreciated that other configurations are possible. The frame 42 may further include a pair of side support beams 52a, 52b positioned left and right of the stick-receiving area and separated by a distance generally corresponding to the length of the individual sticks. The front, back and side support beams, 48, 50, 52, therefore act as a container maintaining the received sticks in a stack, such as the single vertical stack 46.

The stick-receiving area 44 has an open top end 54 and an open bottom end 56. In operation, the sticks are received in the stick-receiving area 44 from the open top end 54 and are retained therein in the vertical stack 46. In the illustrated embodiment, the sticks 45 are stacked along their longitudinal sides. It will be readily understood that in other variants the stick may be stacked face to face. As explained further below, the stack is maintained in place within the stick-receiving area from below.

In operation, the sticks may be fed into the stick-receiving area from a stick feeding device (not shown). In other embodiments, the sticks may be fed manually. In some variants, the sticks may be fed into the stick-receiving area in batches, for example as a full vertical stack which is fully dispensed before the next batch is provided. In other variants, the sticks may be fed into the stick-receiving area in a continuous or intermittent manner.

Referring to FIGS. 10A to 14C, the stick distributing unit 40 may further include a hold-and-release mechanism 60 configured to dispense each stick 45 of the vertical stack from the stick-receiving area 44. As will be described further below, in this embodiment, the hold-and-release mechanism 60 is adapted to dispense the sticks one-by-one from the open bottom end 56 of the stick-receiving area.

In some embodiments, and as will be described further below, the hold-and-release mechanism 60 includes a first holding member adapted to hold and release a predetermined spacer stick from the vertical stack, and a second holding member adapted to hold and release another predetermined spacer stick from the vertical stack. In some embodiments, the second holding member is adapted to cooperate (e.g., hold and release) the spacer stick adjacent the spacer stick engaged by the first holding member. More specifically, in the illustrated exemplary embodiment, the first holding member can include at least one lower holding member 62 adapted to selectively hold and release a bottommost stick 45a of the vertical stack, and the second holding member can include at least one upper holding member 80 adapted to selectively hold and release a penultimate stick 45b of the vertical stack.

Figure 10A:
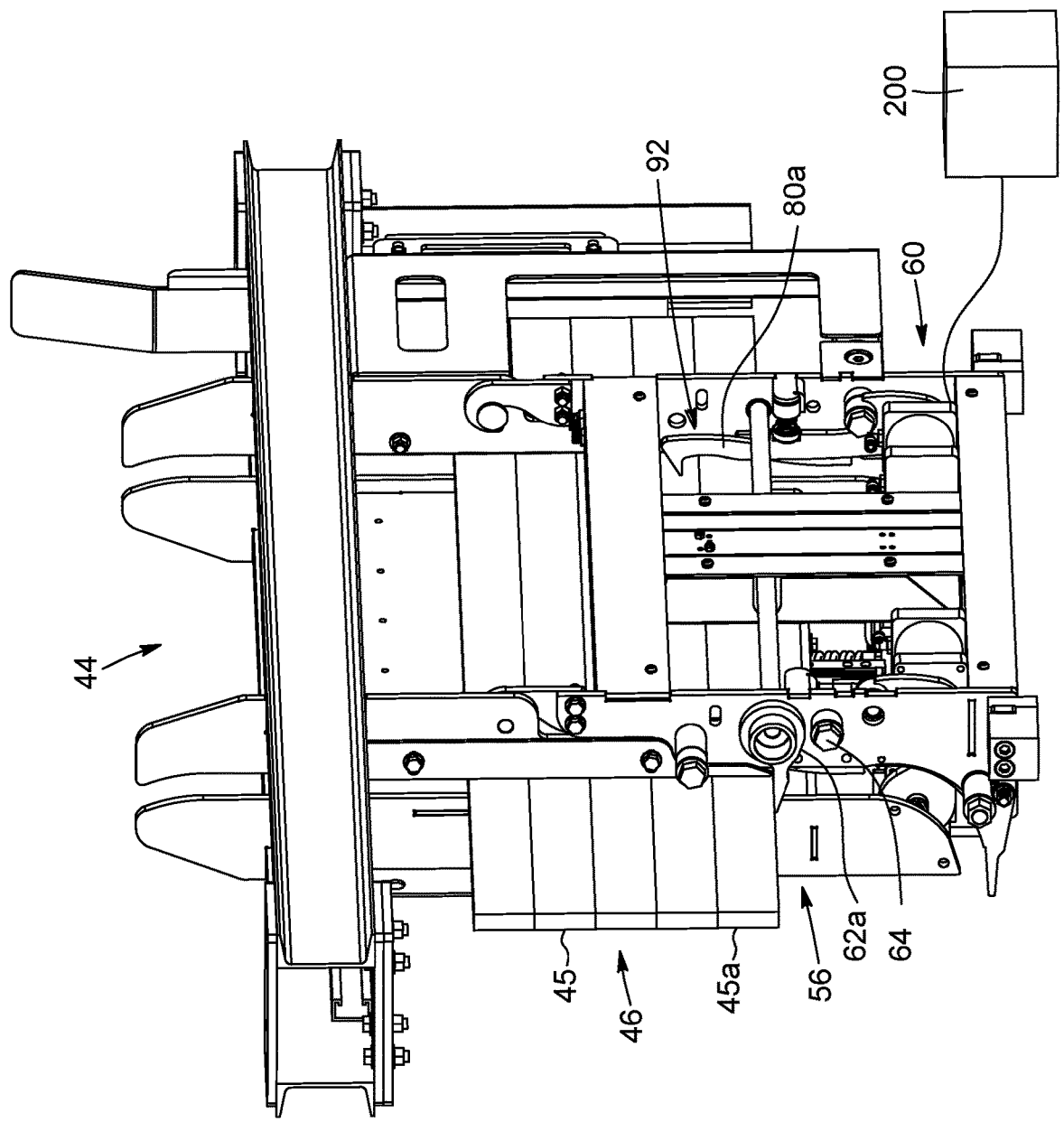
FIGS. 10A and 10B are rear perspective views of the stick distributing unit shown in FIG. 4A, showing a hold-and-release mechanism and a controller for operating a stick dispensing routine of the hold-and-release mechanism, according to an embodiment.
Figure 10B:
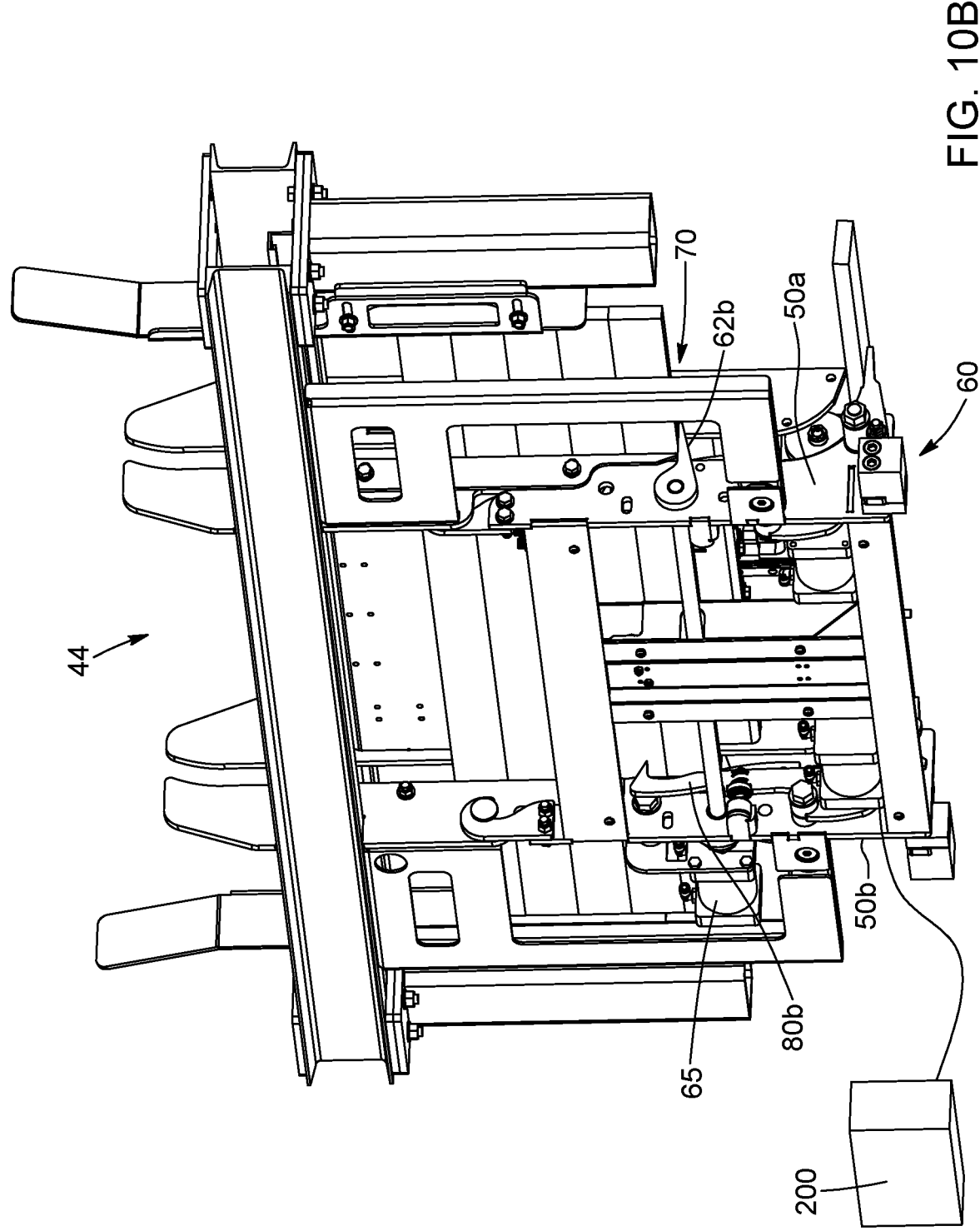
Figure 11A:
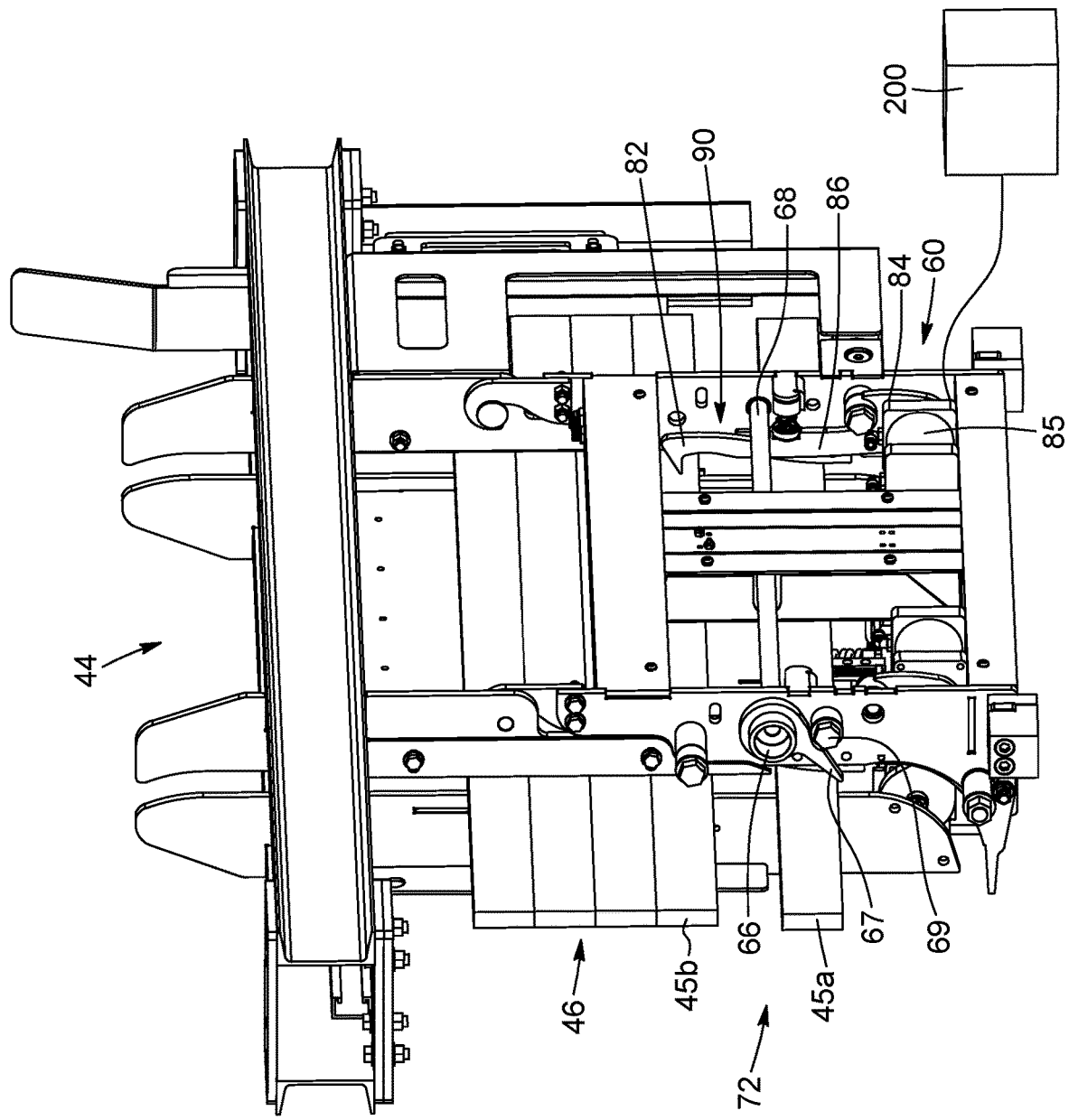
Figure 12:
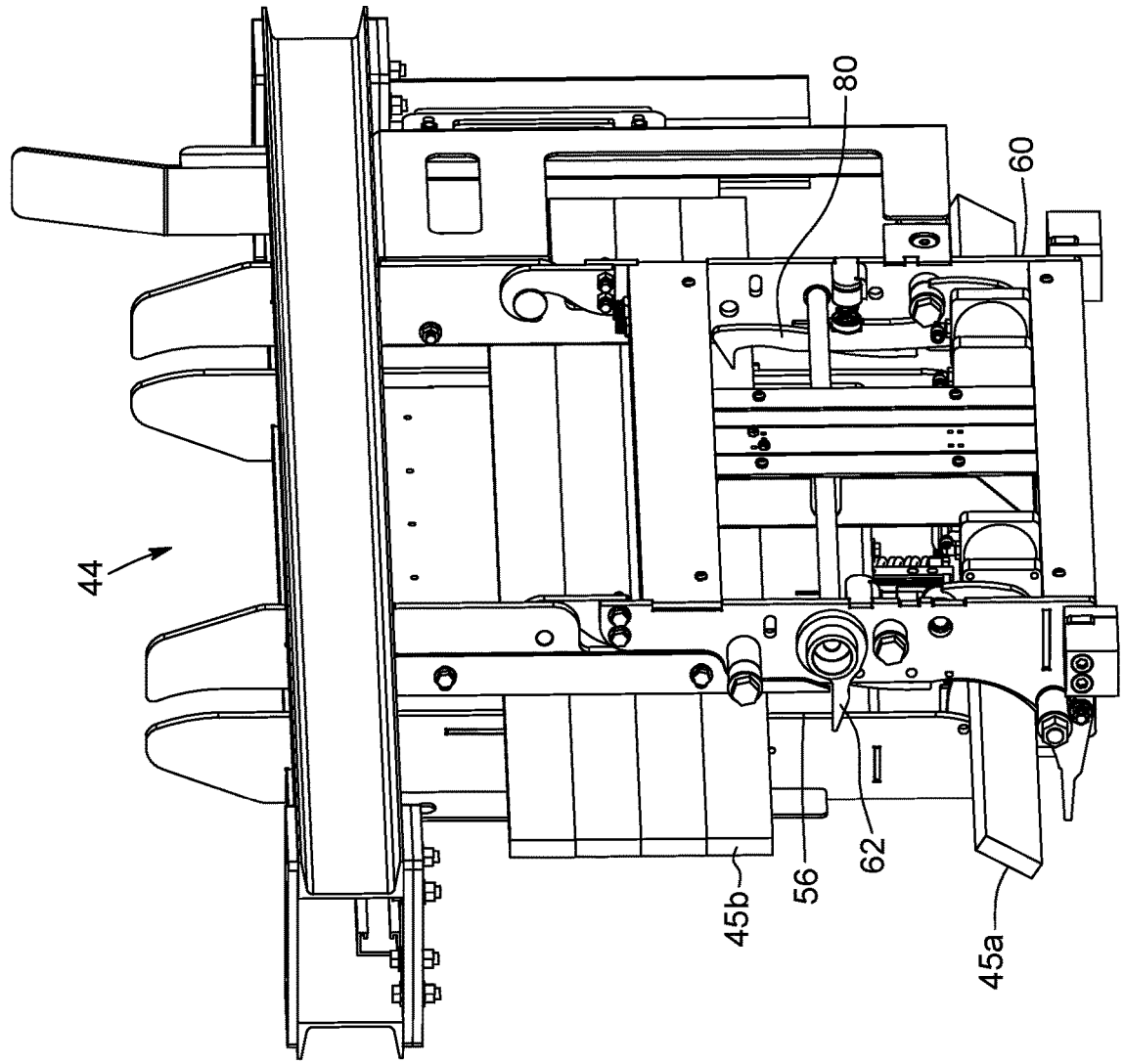
FIG. 12 is a rear perspective view of the stick distributing unit shown in FIG. 4A, illustrating the bottommost stick descending along a guiding path toward the stick-laying mechanism, according to an embodiment.
Figure 13A:
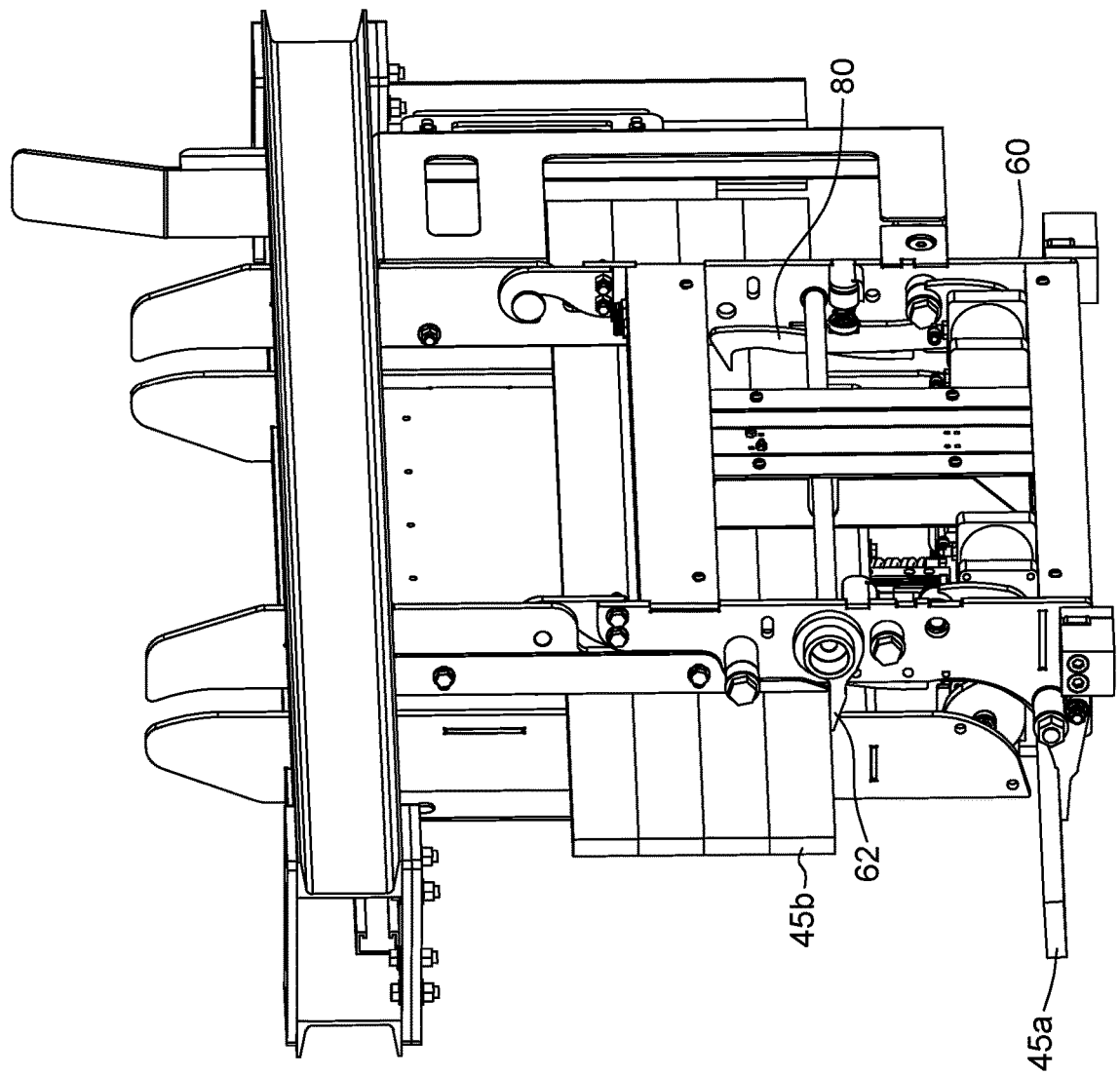
FIG. 13A is a rear perspective view of the stick distributing unit shown in FIG. 4A, illustrating the previously released bottommost spacer stick held by the stick-laying mechanism, and the previous penultimate spacer stick being a new bottommost spacer stick of the vertical stack, according to an embodiment.
Figure 13B:
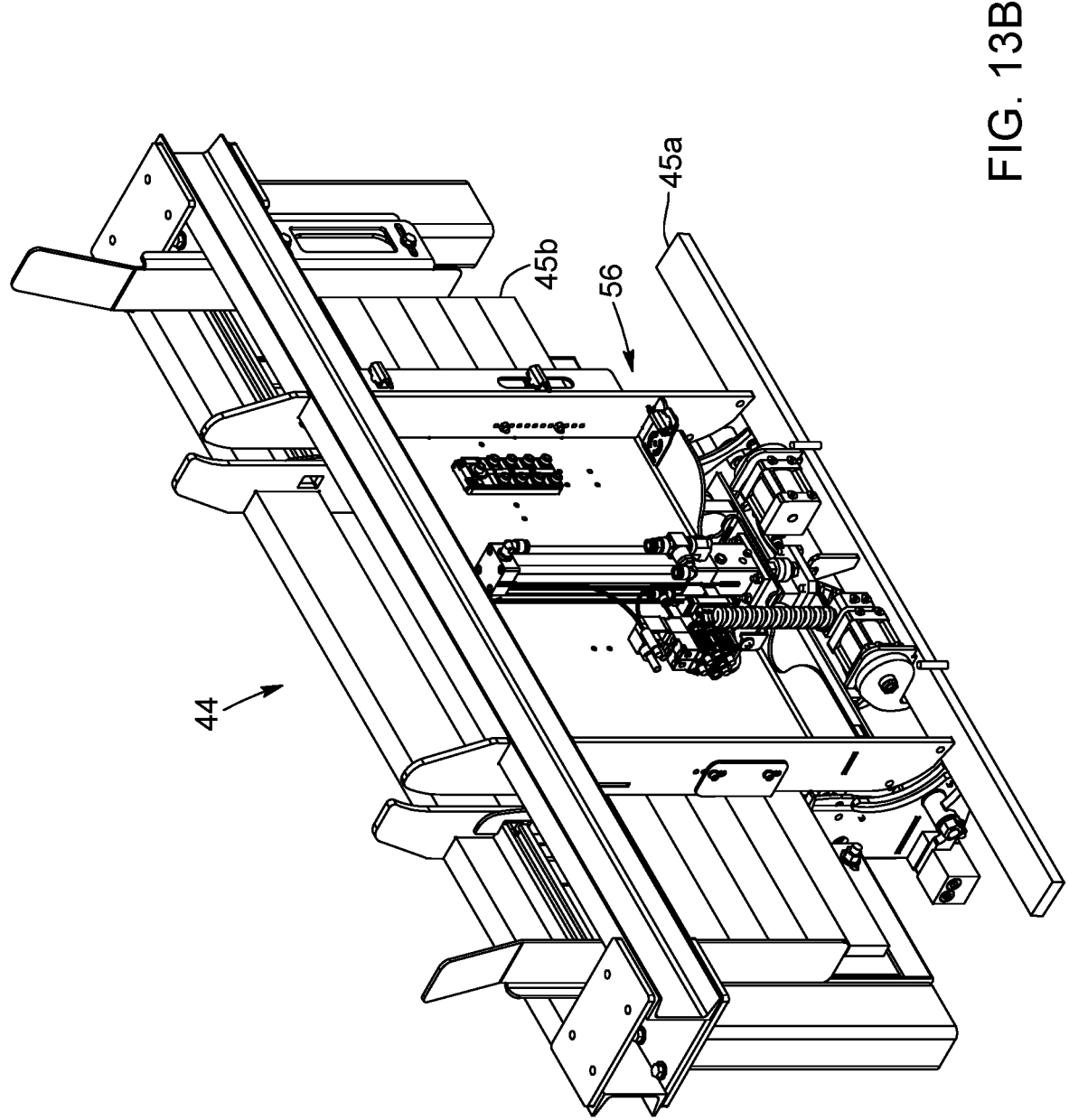
FIG. 13B is a front perspective view of the stick distributing unit of FIG. 13A, showing gripping fingers of the stick-laying mechanism holding a spacer stick, according to an embodiment.
Figure 14A:
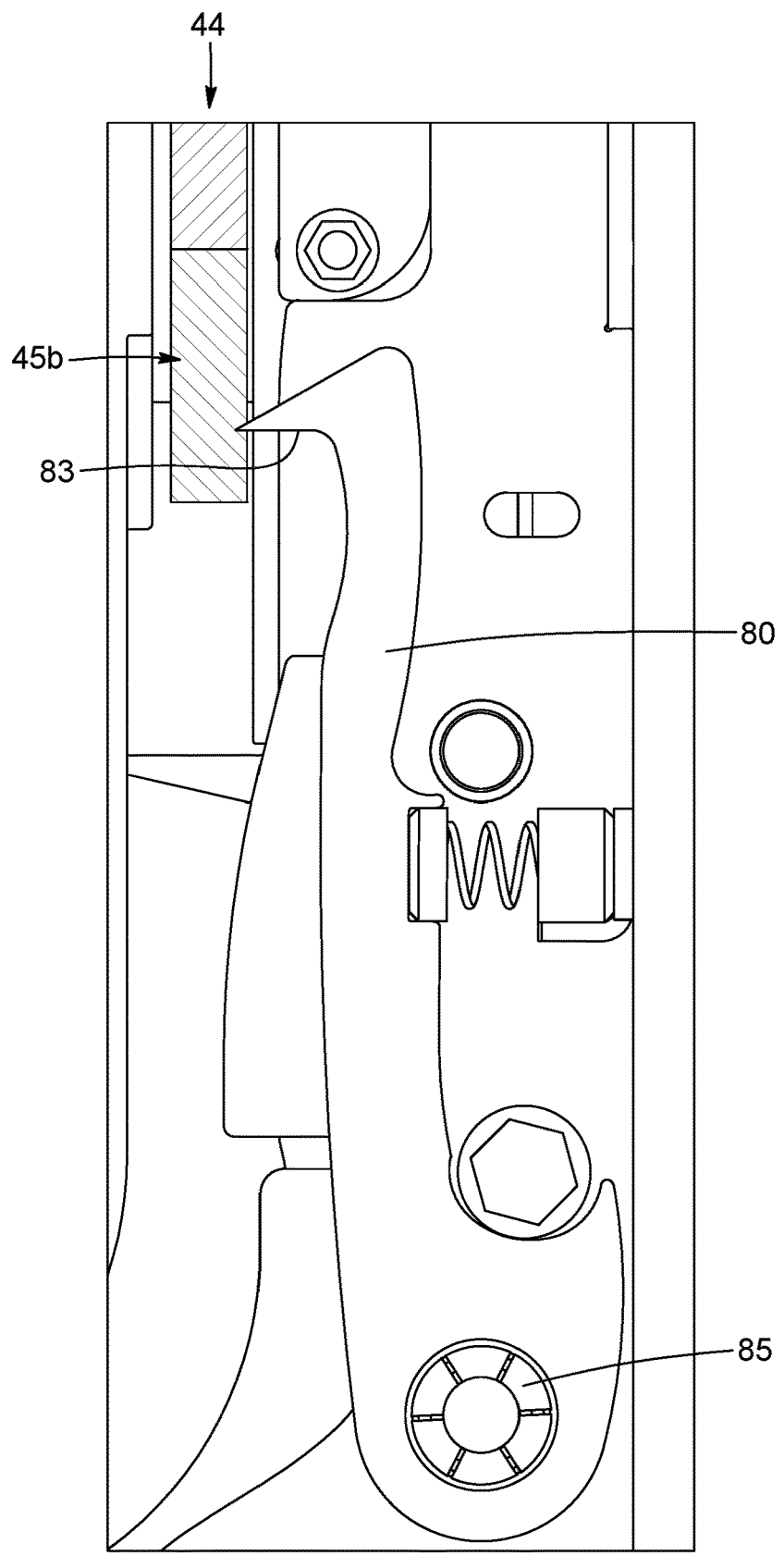
FIGS. 14A to 14D are enlarged cross-sectional views of a portion of the hold-and-release mechanism according to an embodiment, showing the upper holding member engaged with the penultimate spacer stick (FIGS. 14A and 14D) and disengaged from the penultimate spacer stick (FIGS. 14B and 14C).
Figure 14B:
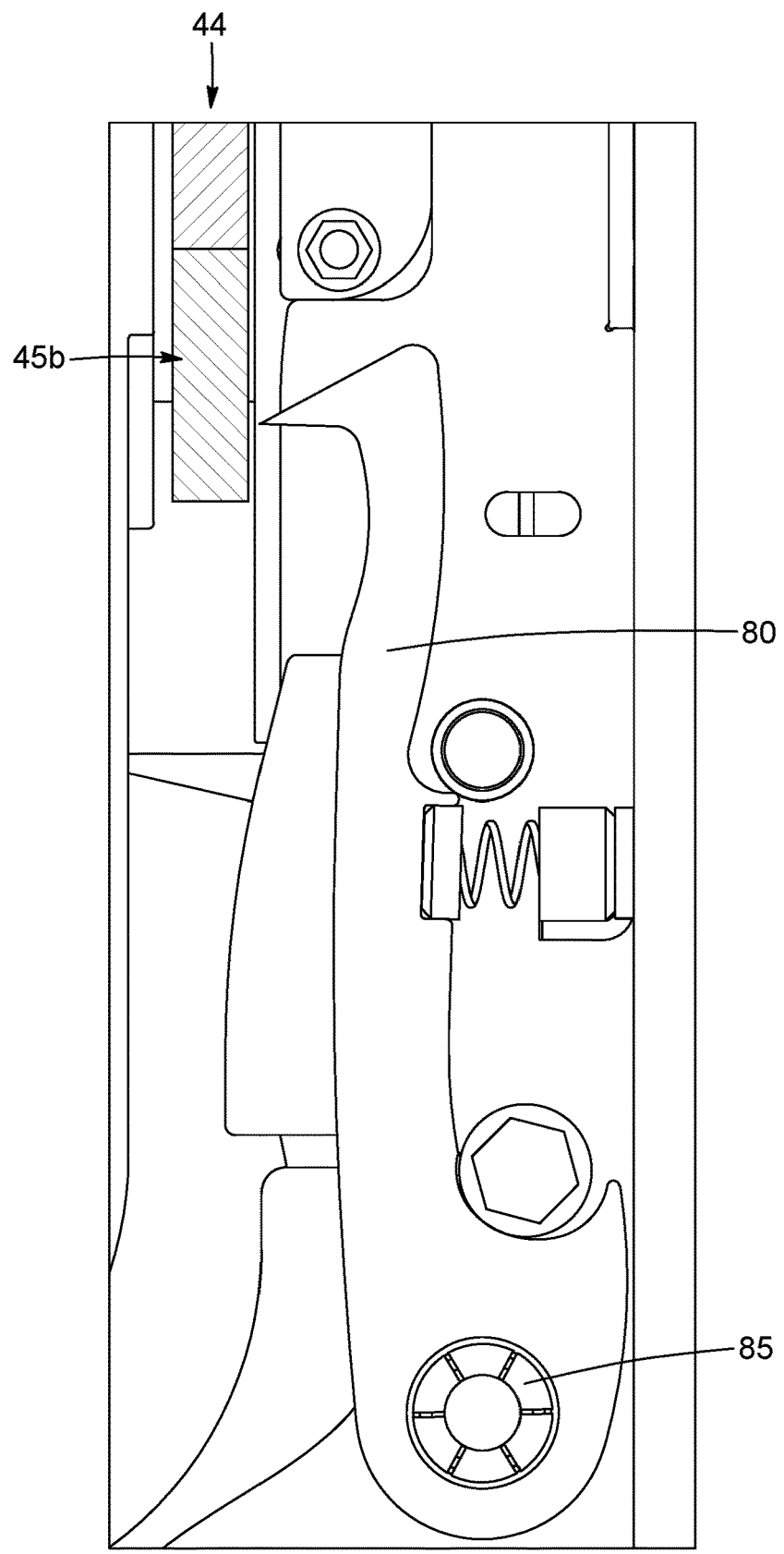
Figure 14C:
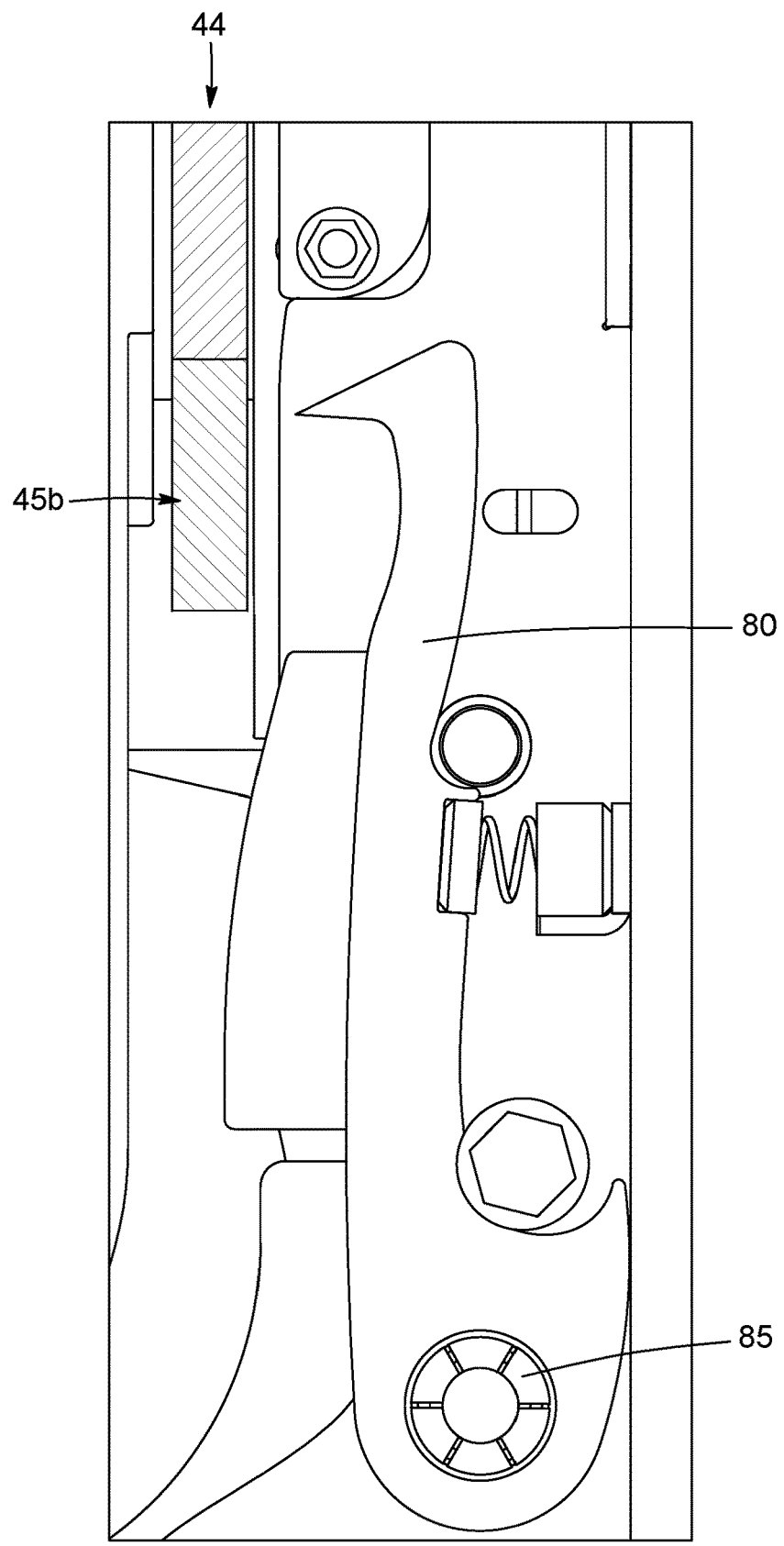
Figure 14D:
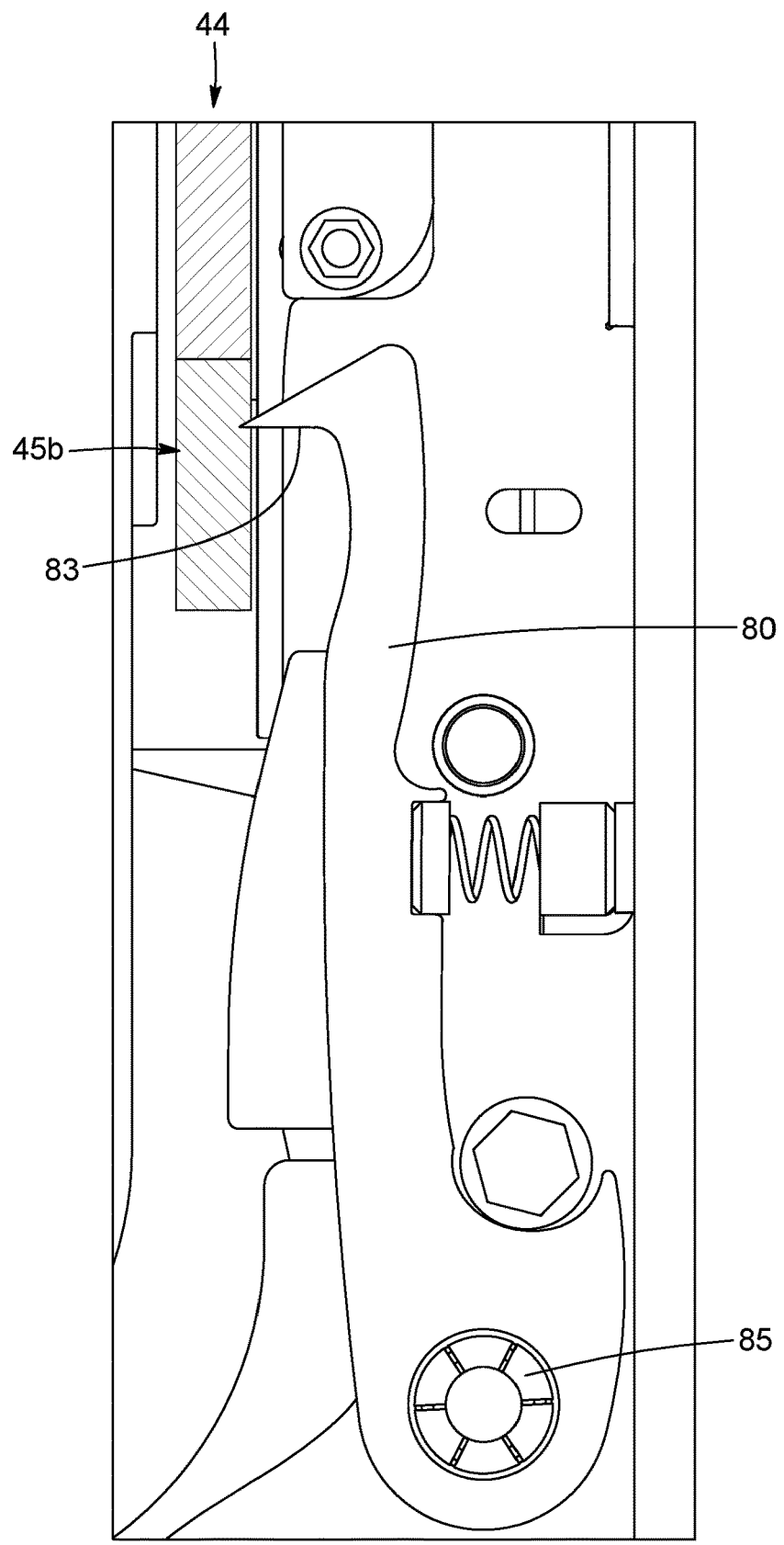
Figure 15:
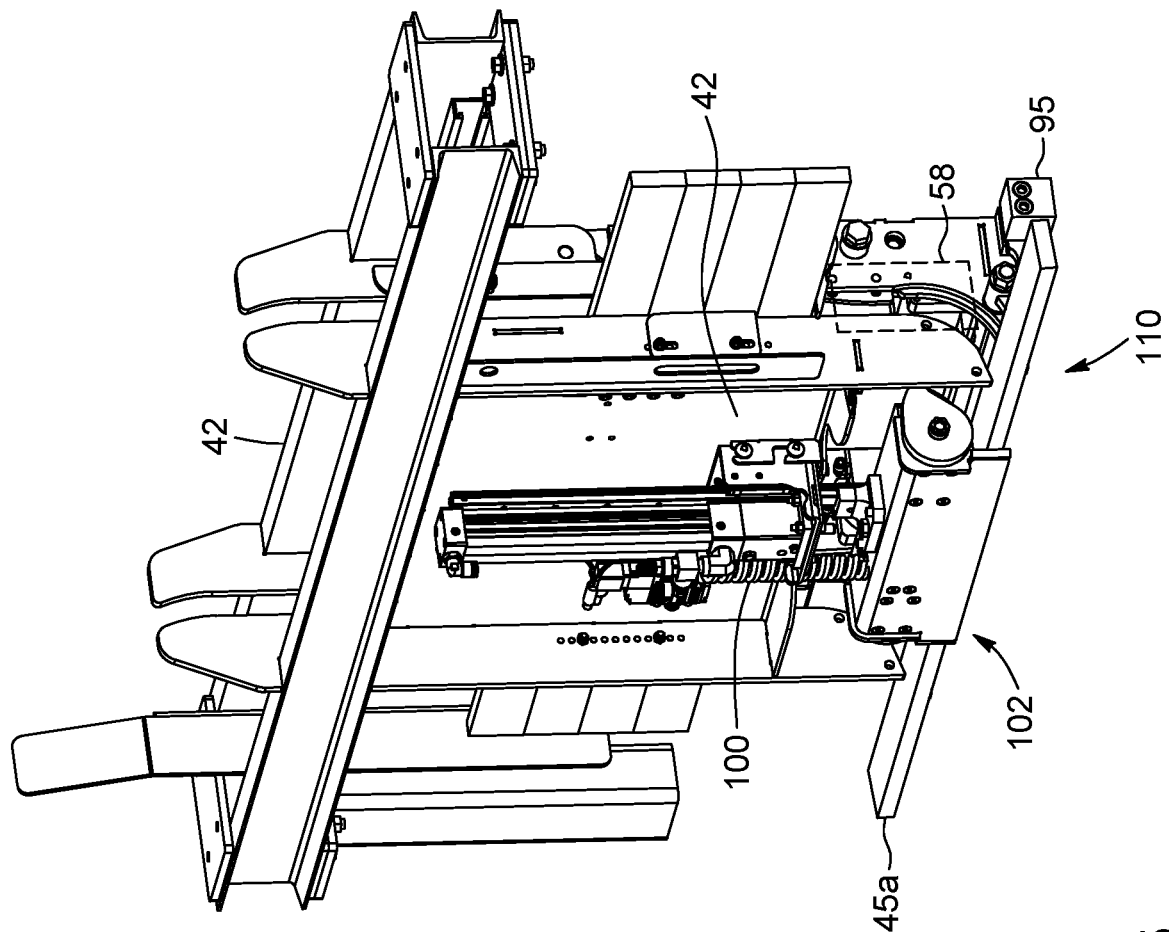
FIGS. 15 to 18 are front perspective views of the stick distributing unit shown in FIG. 4A, showing the stick-laying mechanism receiving a spacer stick from the vertical stack (FIG. 15), gripping the received spacer stick (FIG. 16), extending away from the vertical stack holding the spacer stick (FIG. 17) and releasing the held spacer stick (FIG. 18), according to an embodiment.
Figure 16:
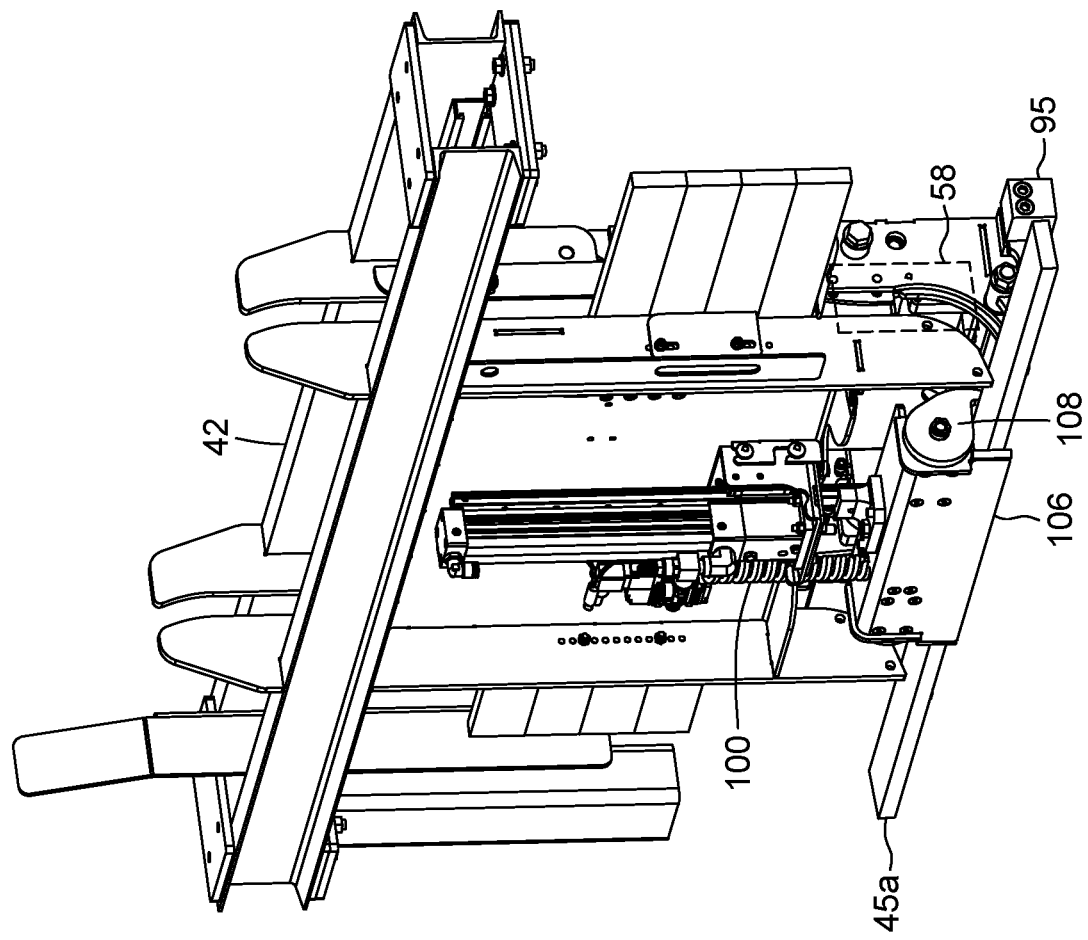
Figure 17:
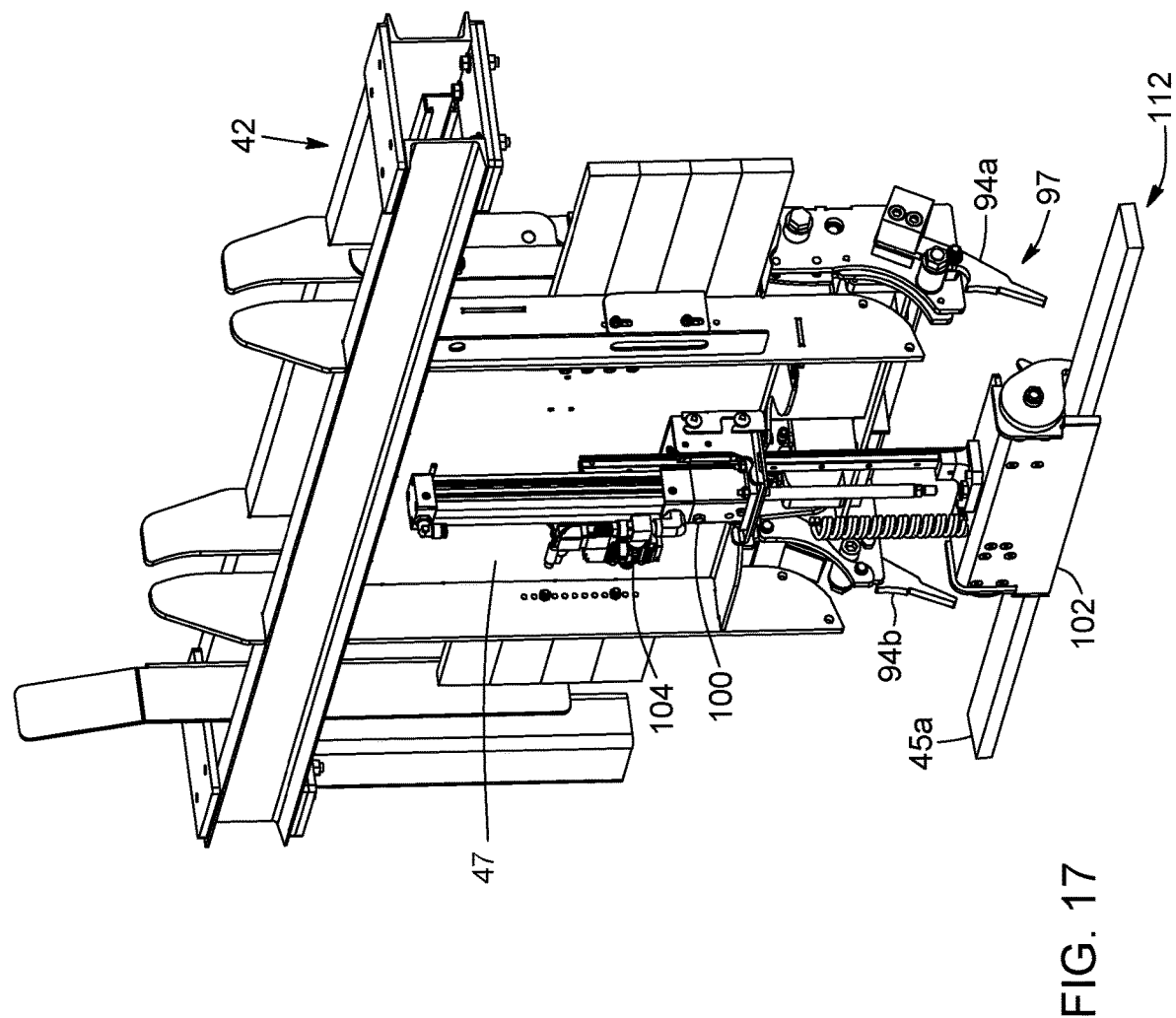
Figure 18:
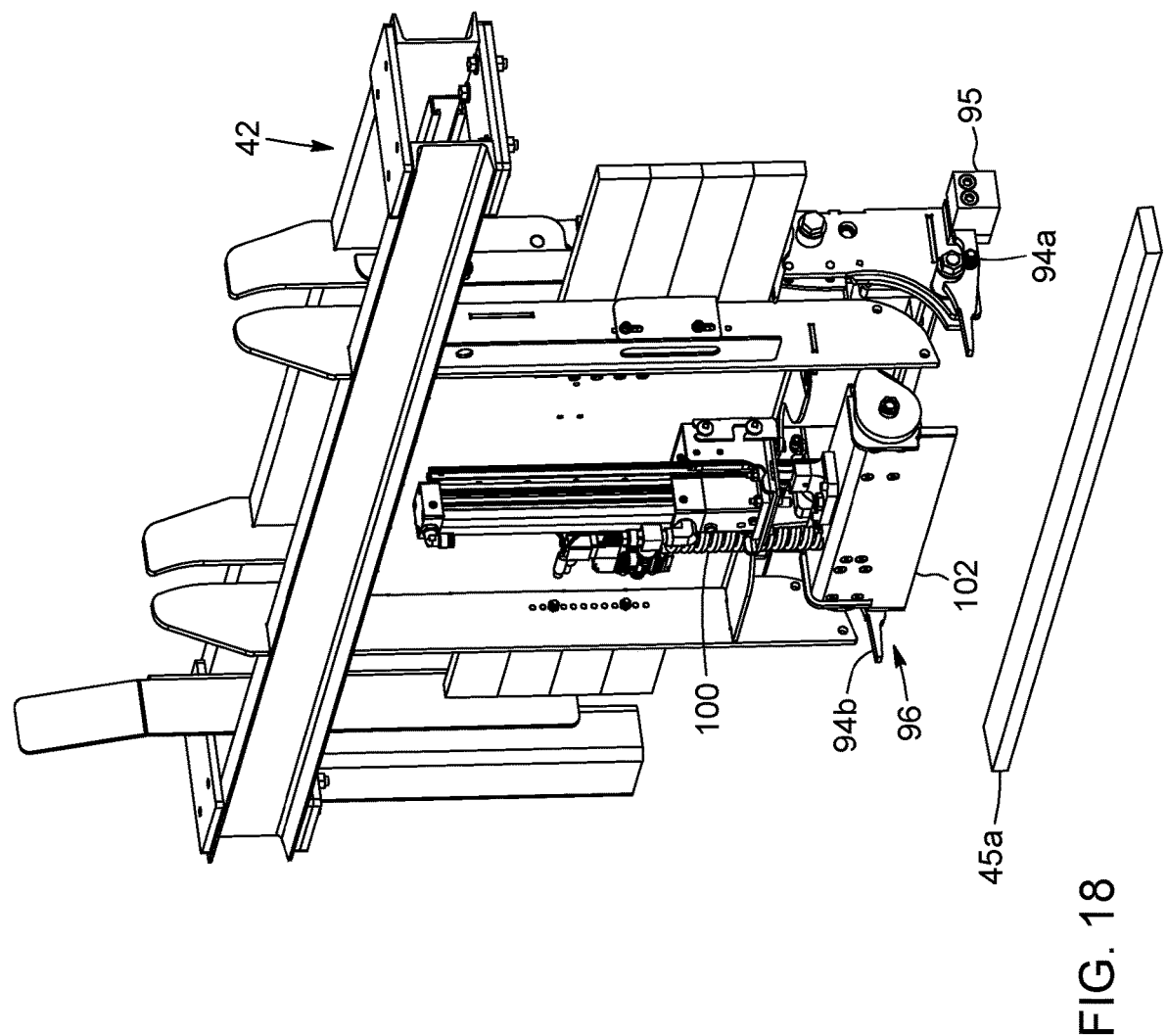

Referring more particularly to FIGS. 10A, 10B and 11A, one example of the at the least one lower holding member 62 is shown. In this variant, the at least one lower holding member 62 includes a pair of pivotable bottom catches 62a,b provided on the frame 42 adjacent the stick-receiving area 44, such as on a rear side thereof and just below the open bottom end 56. In the illustrated embodiment, the pivotable bottom catches 62a,b are mounted to respective back support beams 50a,b. Each pivotable bottom catch has a rotating portion 66 and a support projection 67 projecting radially from the rotating portion 66. In some embodiments, the rotating portions 66 of both pivotable bottom catches 62a,b are mounted on a common rotating shaft 68. The hold-and-release mechanism 60 may further include a rotary actuator 65 configured to rotate the shaft 68 back and forth, thereby rotating the bottom catches 62a,b accordingly. However, it is appreciated that the bottom catches 62a,b can be provided with respective rotating shafts connected to a common rotary actuator, or to respective actuators. The rotary actuator(s) 65 may be an electric motor or a pneumatic system connected to and moving the rotating shaft in a manner well known in the art.

The lower holding member 62 (e.g., the bottom catches 62a,b) is operable between a holding position 70 (see FIGS. 10A and 10B) where the lower holding member holds or retains the bottommost stick 45a of the vertical stack 46, and a release position 72 (see FIG. 11A) where the lower holding member releases the bottommost stick 45a. In the illustrated embodiment, when the lower holding member 62 is in the holding position 70, the bottom catches 62a,b are positioned to have their respective projections 67 extend generally horizontally to engage the stick-receiving area underneath the bottommost stick 45a. The bottommost stick 45a is therefore supported from below at two points, and the remainder of the sticks 45 of the vertical stack 46 are supported over the bottommost stick 45*a*. To operate the lower holding members 62 from the holding position to the release position, the rotary actuator 65 rotates the shaft 68 which engages the rotating portions 66 in rotation such that the support projections 67 are pivoted downwards. The rotating portions 66 are rotated until the support projections 67 clear a path directly underneath the stick-receiving area 44. A projection stop 69 may be provided next to one or both pivotable bottom catches 62*a,b* to block the movement of the support projection 67 past its intended range of motion.

Still referring to FIGS. 10A, 10B, 11A and 11B, by way of example, the at least one upper holding member 80 may be embodied by one or two grip hooks 80*a,b* provided adjacent the stick-receiving area 44, such as on a rear side thereof similar to the lower holding member 62. In the illustrated embodiment, each grip hook 80*a,b* has a substantially flat body being generally S-shaped and includes a gripping top portion 82 and a pivoting bottom portion 84 joined by a generally curved or arcuate middle section 86 (also illustrated in FIGS. 14A to 14D).

The stick distributing unit 40 includes a grip hook rotary actuator 85 provided with a rotating shaft coupled to the pivoting bottom portion 84 adapted to pivot the grip hooks 80*a,b* about an axis perpendicular to its flat body plane. The pivoting of the grip hooks 80*a,b* moves the gripping top portion 82 back and forth with respect to the rear face of a predetermined stick of the stack 46. In this embodiment, the predetermined stick corresponds to the penultimate stick 45*b*, i.e., the stick following the bottommost stick in the stack. The gripping top portion 82 may end in a tooth 83 pointing towards the rear surface of the penultimate stick and configured to engage this rear surface to grip the penultimate stick 45*b* (further illustrated in FIGS. 14A and 14D). The at least one upper holding member 80 may therefore be operable between a holding position 90, where the grip hooks 80*a,b* are adapted to hold the penultimate stick 45*b* of the vertical stack 46, for example, when the tooth 83 of the grip hooks 80*a,b* engage its rear surface, and a release position 92, where the grip hooks are adapted to release the penultimate stick 45*b* (illustrated in FIG. 14C).

Still referring to FIGS. 10A, 10B, 11A and 11B, in some embodiments, the stick dispensing unit 40 further includes a controller 200 configured to provide control signals operating the stick dispensing unit 40 and defining a stick dispensing routine. The controller 200 may, for example, be embodied by one or more memories sending computational instructions to at least one of a processor, a computer, a circuit chip or any other electronic means of sending signals to the actuators 65, 85 or other elements controlling the movements of the components of the stick dispensing unit 40, such as the lower and upper holding members 62,80.

Referring to FIGS. 10A and 10B, the stick dispensing routine may include a first step of setting the lower holding member 62 in the holding position 70 and the upper holding member 80 in the release position 92. The vertical stack 46 is therefore fully supported from the bottommost stick 45*a* in the stick-receiving area 44.

Referring to FIGS. 11A to 13B, the stick dispensing routine next includes a step of setting the upper holding member 80 to the holding position 90, to support the vertical stack 46 from the penultimate stick 45*b* in the stick-receiving area 44, and setting the lower holding member 62 to the release position 72, thereby releasing the bottommost stick 45*a* to fall through the bottom end 56 of the stick-receiving area 44.

It has been observed by the inventors that, in some instances, the bottommost stick 45*a* can remain stuck to the penultimate stick 45*b* of the stack 46. Several factors may lead to this problem. This may, for example, be due to imperfections in the wood of the stick, e.g., curve, wane, broken sections, bow or snags, either naturally present in the stick or created by wear after multiple uses. Differences in the thickness of adjacent sticks can also be a contributing factor. Also, the pressure of the remainder of the stack on top of the bottommost and penultimate sticks or the shocks imposed as more sticks are added during the stacking process can lead to a wedge being created between two sticks or a stick and the surrounding frame. Referring to FIGS. 14A to 14D, in order to free the bottommost stick 45*b* from such an entanglement, the stick distributing routine can include an additional step of knocking on the penultimate stick 45*b*.

In the illustrated embodiment, this is achieved by quickly releasing and re-engaging the upper holding member 80 (e.g., the at least one upper holding member quickly transitions between the holding position and the release position). This may, for example, be accomplished by quickly operating the rotary actuator 85 associated with the upper holding member 80 to rotate the grip hooks 80*a,b* away from the stick receiving area 44 for a small period of time (e.g., a fraction of a second of the order of about 100 µs), and back toward the stick receiving area 44 to re-engage the rear surface of the penultimate stick 45*b*. As will be readily understood by one skilled in the art, the remaining sticks of the stack will begin to fall during the unengaged period, and the duration of this period may be selected to ensure that the penultimate stick remains within gripping range of the gripping hooks 80*a,b*. As can be seen from a comparison of FIGS. 14A and 14D, the penultimate stick 45*b* is gripped by the tooth 83 of the gripping hook 80 after the knocking step at a location along the rear surface of the penultimate stick 45*b* slightly above the location it was gripping prior to the knocking step.

Advantageously, the knocking step has the effect of creating a shock wave or shaking the penultimate stick 45*b*, thereby dislodging the bottommost stick from the penultimate stick 45*b* and allowing the bottommost stick to be dispensed from the bottom end of the stick receiving area, as intended.

It will be readily understood that in other embodiments, the knocking step may be accomplished using other means then operating the upper holding member via the controller. In other variants, a separate device or mechanism may be provided for this purpose. For example, a rotating cam, a hammer, a cylinder, a vibrating device, etc., may be continuously operated so as to periodically knock on the penultimate stick in synchronicity with the stick dispensing routine.

The stick dispensing routine finally involves returning to the step of setting the lower holding member 62 in the holding position 70 and the upper holding member 80 in the release position 92. It is thus noted that, what was previously the penultimate stick 45*b* is then released from the upper holding member 80 and travels downward, followed by the remainder of the stack 62, until it is stopped and supported but the lower holding member 62, becoming the bottommost stick 45*a* of the next iteration of the stick dispensing routine.

Referring to FIGS. 19A through 19G, a more detailed embodiment of a stick dispensing routine is illustrated, by way of example. FIG. 19A shows a "standby" position wherein both the bottommost stick and the penultimate stick are retained, by the lower and upper holding members such as described above. On FIG. 19B, both holding members are operated to release their respective sticks, and the sticks begin to free-fall. On FIG. 19C, only the upper holding member is re-engaged, both "catching" the penultimate stick and knocking on it, dislodging the bottommost stick to continue its fall, if required (FIG. 19D). At FIG. 19E the bottom holding member is re-engaged, after the bottommost stick has cleared the area above. At FIG. 19F, the upper holding member is disengaged, resetting the stack such that the previously penultimate stick, now the bottommost stick, falls onto the lower holding member, followed by the remainder of the stack. The upper holding member is then re-engaged (FIG. 19G), returning to the standby position of FIG. 19A.

Referring to FIGS. 15 to 18, as mentioned above, once released, the bottommost stick 45*a* falls through the open bottom end 56 of the stick-receiving area 44 under the effect of gravity. In one embodiment, the front beams 48 and rear beams 50 (illustrated in FIGS. 4A and 4B) of the frame have matching curved profiles 99 in their lower sections underneath the stick-receiving area 44, providing a guiding path 58 smoothing the descent of the bottommost stick 45*a* (also seen in FIGS. 6 and 7). Also, the guiding path 58 may also provide fora shifting of the orientation of the stick from generally vertical to any suitable angle, such as horizontal, for example. In some embodiments, a pair of support arms 94*a,b* may be pivotally mounted on either sides of the frame and coupled to rotary actuators 95 so that the support arms 94 have a raised or receiving position 96 (FIGS. 6, 7 and 18) where they project (e.g., horizontally) from the exit of the guiding path 58 to receive the released stick at the end of its travel along the guiding path 58, and a lowered or releasing position 97 (FIG. 17) where they are pivoted downwardly away from the exit of the guiding path to let go of the previously held stick.

The stick distributing unit may further include a stick-laying mechanism 100 configured to receive a spacer stick from the hold-and release mechanism (e.g., the bottommost stick 45*a*) upon release thereof by the lower holding member, and lay the received spacer stick over the board layer.

In the illustrated embodiment, the stick-laying mechanism 100 includes a moving head 102 operatively mounted on the frame 42 so as to move (e.g., up and down) with respect to the frame 42. The moving head 102 can be operable between a stick-receving position, such as an upper position 110, in which the moving head is adapted to receive and grab or hold the released stick 45*a* when it reaches the end of the guiding path 58, for example when it rests horizontally on the support arms 94, and a stick-laying position, such as a lower position 112, adjacent to (e.g., immediately above) the board stacking device (not shown) to drop off the released stick 45*a* at its intended place over the board layer. By way of example, in the illustrated embodiment, the moving head 102 is moved up and down through a pneumatically-actuated shaft 104 mounted on a front panel 47 of the frame (also seen in FIG. 17), although other mechanisms and/or systems for displacing the moving head are possible and may be used.

In some embodiments, the moving head 102 may include an inverted L-shaped bracket 106 affixed to the bottom end of the pneumatically-actuated shaft. The moving head 102 may further include a pair of grabbing fingers 108 pivotally mounted on either side of the L-shaped bracket 106. The grabbing fingers 108 can rotate to grab the released stick 45*a* from above when the stick is positioned on the support arms 94, and let go the released stick 45*a* once in position over the board layer. In the illustrated variants, the grabbing fingers 108 are operated by independent rotary actuators, although other configurations are possible.

The stick-laying mechanism 100 further includes a controller configured to control the operation of its different components to operate a stick-laying routine.

The controller may be the same controller (illustrated in FIGS. 10A to 11) operating the movements of the lower and upper holding members or another controller entirely. Referring to FIGS. 15 to 18, the stick-laying routine may include the following steps:

a) Pivoting the support arms 94 in their raised position 96 and receiving the released stick 45*a* thereon;

b) Setting the moving head 102 in the upper position 110 and rotating the grabbing fingers 108 to grab the released stick 45*a*;

c) Pivoting the support arms 94 in the lowered position 97;

d) Lowering the moving head 102 to the lower position 112 just above the board layer on the board bundle; and e) Rotating the grabbing fingers 108 to let go of the released stick 45*a*, therefore laying the released stick 45*a* on the board layer.

The stick laying routine is preferably coordinated with the stick dispensing routine in order to optimize the throughput of the stick laying apparatus. For instance, it is noted that different steps of the stick dispensing routine may be performed generally simultaneously to each other, or in quick succession. Similarly, different steps of the stick-laying routine may be performed generally simultaneously to each other, or in quick succession. Alternatively, or additionally, one or more steps of the stick dispensing routine can be performed substantially simultaneously with one or more steps of the stick-laying routine, for example.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the present disclosure.

As used herein, the terms "coupled", "coupling", "attached", "connected", "joined" or variants thereof can have several different meanings depending in the context in which these terms are used. For example, the terms coupled, coupling, connected, joined or attached can have a mechanical connotation. For example, as used herein, the terms coupled, coupling, joined or attached can indicate that two elements or devices are directly connected to one another or connected to one another through one or more intermediate elements or devices via a mechanical element depending on the particular context.

Similarly, in the context of the present disclosure, the expressions "unit", "assembly", "assemblage", "subassembly", "subsystem", "mechanism", "apparatus", "component", as well as any other equivalent expression(s) and/or compound word(s) thereof known in the art can be used interchangeably, as apparent to a person skilled in the art. This applies also for any other mutually equivalent expressions, such as, for example: "fastening", "securing", "locking", "restraining", "affixing", "holding", "adjusting", etc.

Also, in the context of the present description, expressions such as "can", "may", "might", "will", "could", "should", "would", etc., may also be used interchangeably, whenever appropriate, as also apparent to a person skilled in the art.

Furthermore, in the context of the present description, it will be considered that all elongated objects will have an implicit "longitudinal axis" or "centerline", such as the longitudinal axis of a stick, for example. Moreover, components of the present system(s) and/or steps of the method(s) described herein could be modified, simplified, altered, omitted and/or interchanged, without departing from the scope of the present disclosure, depending on the particular applications which the disclosed system is intended for, and the desired end results, as briefly exemplified herein and as also apparent to a person skilled in the art.

In the present disclosure, an embodiment is an example or implementation of the described features. The various appearances of "one embodiment," "an embodiment" or "some embodiments" do not necessarily all refer to the same embodiments. Although various features may be described in the context of a single embodiment, the features may also be provided separately or in any suitable combination. Conversely, although the apparatus and/or the associated units may be described herein in the context of separate embodiments for clarity, it may also be embodied in a single embodiment. Reference in the specification to "some embodiments", "an embodiment", "one embodiment", or "other embodiments", means that a particular feature, structure, or characteristic described in connection with the embodiments is included in at least some embodiments, but not necessarily in all embodiments.

In addition, although the optional configurations as illustrated in the accompanying drawings comprises various components and although the optional configurations of the apparatus as shown may consist of certain geometrical configurations as explained and illustrated herein, not all of these components and geometries are essential and thus should not be taken in their restrictive sense, i.e., should not be taken as to limit the scope of the present disclosure. It is to be understood that other suitable components and cooperations thereinbetween, as well as other suitable geometrical configurations may be used for the implementation and use of the apparatus, and corresponding parts, as briefly explained and as can be easily inferred herefrom, without departing from the scope of the disclosure.

The invention claimed is:

1. A stick distributing unit for use in a stick laying apparatus for laying a plurality of spacer sticks over a board layer, comprising:
   a frame defining a stick-receiving area adapted to receive the plurality of spacer sticks in a vertical stack, the stick-receiving area having an open bottom end;
   a hold-and-release mechanism configured to dispense one-by-one each stick of the vertical stack from the open bottom end of the stick-receiving area, the hold-and-release mechanism comprising:
      at least one lower holding member, operable between a lower holding position, where the at least one lower holding member is adapted to hold a bottommost stick of the vertical stack, and a lower release position, where the at least one lower holding member is adapted to release the bottommost stick;
      at least one upper holding member, operable between an upper holding position, where the at least one upper holding member is adapted to hold a penultimate stick of the vertical stack, and an upper release position, where the at least one upper holding member is adapted to release the penultimate stick; and
   a controller configured to provide control signals operating a stick dispensing routine comprising the steps of:
      a) setting the at least one lower holding member in the lower holding position and the at least one upper holding member in the upper release position to support the vertical stack from the bottommost stick in the stick-receiving area;
      b) setting the at least one upper holding member to the upper holding position to support the vertical stack from the penultimate stick in the stick-receiving area, and setting the at least one lower holding member to the lower release position, thereby releasing the bottommost stick to fall through the open bottom end of the stick-receiving area; and
      c) cyclically repeating steps a) and b);
   a stick-laying mechanism configured to receive the bottommost stick upon release by the at least one lower holding member and laying the same over the board layer,
   wherein the hold-and-release mechanism is further configured to knock on the penultimate stick between steps b) and c), and
   wherein the stick dispensing routine operated by the controller comprises quickly releasing and re-engaging the at least one upper holding member with the penultimate stick, thereby creating the knock on the penultimate stick.

2. The stick distributing unit according to claim 1, wherein the frame comprises front support beams and back support beams, the front support beams and the back support beams being spaced from each other by at least a width of an individual spacer stick.

3. The stick distributing unit according to claim 2, wherein the frame further comprises side support beams positioned on either side of the front and back support beams, the side support beams being spaced from each other by at least a length of the individual spacer stick, and wherein the front support beams, the back support beams and the side support beams define the stick-receiving area.

4. The stick distributing unit according to claim 3, wherein the front support beams and the back support beams comprise matching curved profiles at respective bottom ends thereof forming a guiding path below the open bottom end of the stick-receiving area shaped to shift an orientation of the bottommost stick from vertical to substantially horizontal as the bottommost stick travels along the guiding path towards an exit thereof.

5. The stick distributing unit according to claim 4, wherein the stick-laying mechanism comprises one or more support arms operatively coupled to the frame and operable between a raised position and a lowered position, wherein in the raised position the support arms are positioned and adapted to receive the bottommost stick as it exits the guiding path, and wherein in the lowered position, the support arms pivot downwardly to let go of the bottommost stick.

6. The stick distributing unit according to claim 5, wherein the stick-laying mechanism comprises a moving head operatively mounted to the frame, the moving head being operable to move with respect to the frame between a stick-receiving position and a stick-laying position, wherein in the stick-receiving position, the moving head is adapted to receive and hold the bottommost stick, and wherein in the stick-laying position, the moving head is adapted to release and lay the bottommost stick over the board layer.

7. The stick distributing unit according to claim 6, wherein the stick-laying mechanism comprises a pneumatically-actuated shaft mounted on the frame, the pneumatically-actuated shaft being configured to transition the moving head between the stick-receiving position and the stick-laying position.

8. The stick distributing unit according to claim 7, wherein the moving head further comprises a body and grabbing fingers pivotally mounted on either side the body, the grabbing fingers being adapted to rotate to retain the bottommost stick between the grabbing fingers and the body, and selectively let go of the bottommost stick once in position over the board layer.

9. The stick distributing unit according to claim 8, wherein the controller is further configured to provide the control signals to the stick-laying mechanism for operating the stick dispensing routine comprising of the steps of:
   a) operating the support arms in the raised position and receiving the bottommost stick thereon;
   b) setting the moving head in the stick-receiving position and rotating the pair of grabbing fingers to hold the bottommost stick;
   c) pivoting the support arms to the lowered position;
   d) displacing the moving head into the stick-laying position above the board layer; and
   e) rotating the pair of grabbing fingers to let go of the bottommost stick, therefore laying the bottommost stick on the board layer.

10. The stick distributing unit according to claim 1, wherein the at least one lower holding member comprises bottom catches pivotally coupled to the frame adjacent the stick-receiving area and substantially below the open bottom end.

11. The stick distributing unit according to claim 10, wherein each bottom catch comprises a rotating portion pivotally coupled to the frame, and a support projection projecting radially from the rotating portion, and wherein the support projection is adapted to support the bottommost stick within the stick-receiving area.

12. The stick distributing unit according to claim 1, wherein the at least one upper holding member comprises at least one grip hook adapted to engage the penultimate stick, the at least one grip hook being provided on a rear side of the stick-receiving area.

13. The stick distributing unit according to claim 12, wherein the at least one grip hook is substantially S-shaped and comprises a gripping top portion, a pivoting bottom portion and a curved middle section.

14. The stick distributing unit according to claim 13, wherein the gripping top portion comprises a tooth adapted to engage a rear surface of the penultimate stick when in the upper holding position.

15. A method of laying a spacer stick over a board layer using a stick-distributing unit of a stick-laying mechanism, the stick-distributing unit retaining a plurality of spacer sticks in a stack from below within a stick-receiving area, the method comprising the steps of:
   i. receiving the plurality of spacer sticks in a vertical stack via the stick-receiving area of a frame of the stick-distributing unit, wherein the stick-receiving area has an open bottom end, wherein a hold-and-release mechanism of the stick-distributing unit is configured to dispense each stick of the vertical stack one-by-one from the open bottom end of the stick-receiving area, wherein the hold-and-release mechanism includes at least one lower holding member and at least one upper holding member, wherein the at least one lower holding member is operable between a lower holding position and a lower release position, wherein the at least one lower holding member is adapted to hold a bottommost spacer stick of the vertical stack in the lower holding position, wherein the at least one upper holding member is operable between an upper holding position and an upper release position, wherein the at least one upper holding member is adapted to hold a penultimate spacer stick of the vertical stack in the upper holding position;
   ii. retaining the stack of spacer sticks within the stick-receiving area such that the penultimate spacer stick becomes a new bottommost spacer stick, when the bottommost spacer stick is released, by:
      setting the at least one lower holding member in the lower holding position; and
      setting the at least one upper holding member in the upper release position;
   iii. positioning the stick-laying mechanism over the board layer;
   iv. releasing the bottommost spacer stick through the open bottom end of the stick-receiving area and to the stick-laying mechanism of the stick-distributing unit by:
      setting the at least one upper holding member to the upper holding position to support the vertical stack from the penultimate spacer stick in the stick-receiving area; and
      setting the at least one lower holding member to the lower release position;
   v. knocking on the penultimate spacer stick, via the hold-and-release mechanism, by quickly releasing and re-engaging the at least one upper holding member of the hold-and-release mechanism with the penultimate spacer stick, wherein the at least one upper holding member is adapted to release the penultimate spacer stick;
      receiving, via the stick-laying mechanism, the bottommost spacer stick upon release by the at least one lower holding member;
   vi. laying the bottommost spacer stick on the board layer via the stick-laying mechanism.

16. The method of claim 15, wherein the steps ii. to vi. are cyclically repeated using the new bottommost spacer stick.

17. A stick distributing unit for use in a stick laying apparatus for laying a plurality of spacer sticks over a board layer, comprising:
   a frame defining a stick-receiving area adapted to receive the plurality of spacer sticks in a stack and defining a release path to dispense the plurality of spacer sticks thereof;
   a hold-and-release mechanism operatively coupled to the frame, the hold-and-release mechanism being adapted to selectively dispense the spacer sticks from the stick-receiving area one at a time along the release path, the hold-and-release mechanism comprising:
      a first holding member operable to selectively hold and release a bottommost stick of the stack;
      a second holding member operable to selectively hold and release a penultimate stick of the stack; and
      a controller configured to define a stick dispensing routine comprising the steps of:
         a) operating the first holding member to engage and hold the bottommost stick;
         b) operating the second holding member to engage and hold the penultimate stick;

c) operating the first holding member to disengage the bottommost stick to release the bottommost stick from the stick-receiving area;
d) quickly releasing and re-engaging the second holding member with the penultimate stick, thereby creating a knock on the penultimate stick; and
e) cyclically repeating steps a) to c) with remaining sticks from the plurality of spacer sticks;

a stick-laying mechanism configured to receive the bottommost stick from the hold-and-release mechanism and deposit the same over the board layer.

\* \* \* \* \*